US009497512B2

(12) United States Patent
Ukawa et al.

(10) Patent No.: US 9,497,512 B2
(45) Date of Patent: Nov. 15, 2016

(54) CONTENT PLAYER AND METHOD OF CONTROLLING THE SAME

(75) Inventors: Satoshi Ukawa, Komae (JP); Tomoyuki Ohno, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1202 days.

(21) Appl. No.: 12/605,861

(22) Filed: Oct. 26, 2009

(65) Prior Publication Data

US 2010/0125870 A1 May 20, 2010

(30) Foreign Application Priority Data

Nov. 19, 2008 (JP) ................................ 2008-296040

(51) Int. Cl.
| | | |
|---|---|---|
| *H04N 7/10* | (2006.01) | |
| *H04N 7/025* | (2006.01) | |
| *H04N 21/488* | (2011.01) | |
| *H04N 7/173* | (2011.01) | |
| *H04N 21/442* | (2011.01) | |
| *H04N 21/462* | (2011.01) | |

(Continued)

(52) U.S. Cl.
CPC ...... *H04N 21/4882* (2013.01); *H04N 7/17318* (2013.01); *H04N 21/44222* (2013.01); *H04N 21/4622* (2013.01); *H04N 21/47202* (2013.01); *H04N 21/482* (2013.01)

(58) Field of Classification Search
USPC ........................................................ 725/32
See application file for complete search history.

(56) References Cited

U.S. PATENT DOCUMENTS 6,032,180 A * 2/2000 Nishikawa .................... 725/115
6,452,612 B1 * 9/2002 Holtz et al. ................... 715/723
(Continued)

FOREIGN PATENT DOCUMENTS

JP 2001-051926 2/2001
JP 2003-046984 2/2003
(Continued)

OTHER PUBLICATIONS

The above references were cited in a Apr. 27, 2012 Korean Office Action, which is enclosed without English Translation, that issued in Korean Patent Application No. 10-2009-0108980.

*Primary Examiner* — Jonathan V Lewis
(74) *Attorney, Agent, or Firm* — Cowan, Liebowitz & Latman, P.C.

(57) ABSTRACT

A content player which receives a broadcast content and an information content and plays back a video image concerning a content, comprises a channel selection unit configured to select a channel to view the broadcast content; an acquisition unit configured to acquire location information of an information content corresponding to the broadcast content on the channel selected by the channel selection unit; a detection unit configured to detect that the broadcast content on the selected channel has been viewed starting halfway; a determination unit configured to, if the detection unit has detected that the broadcast content has been viewed starting halfway, determine whether to notify that it is possible to view, from the beginning, the broadcast content that has been viewed starting halfway; and a notification unit configured to generate a notification image for notification when the determination unit has determined to notify.

20 Claims, 22 Drawing Sheets

(51) Int. Cl.
*H04N 21/472* (2011.01)
*H04N 21/482* (2011.01)

(56) References Cited

U.S. PATENT DOCUMENTS

| | | | |
|---|---|---|---|
| 7,171,677 B1 * | 1/2007 | Ochiai | 725/80 |
| 7,228,559 B1 * | 6/2007 | Sie | H04N 7/17318 |
| | | | 348/E7.071 |
| 7,293,279 B1 * | 11/2007 | Asmussen | H04N 5/4401 |
| | | | 348/E5.099 |
| 7,400,364 B2 * | 7/2008 | Chen et al. | 348/731 |
| 7,826,711 B2 * | 11/2010 | Russ | G11B 27/105 |
| | | | 386/343 |
| 7,950,040 B2 * | 5/2011 | Sie | H04N 7/17318 |
| | | | 725/102 |
| 8,077,263 B2 * | 12/2011 | Candelore | H04N 5/4403 |
| | | | 340/12.29 |
| 8,180,200 B2 * | 5/2012 | Hasek | H04N 5/783 |
| | | | 386/344 |
| 8,281,341 B2 * | 10/2012 | Ellis | H04N 5/44543 |
| | | | 725/50 |
| 8,312,493 B2 * | 11/2012 | Azam et al. | 725/97 |
| 8,707,376 B1 * | 4/2014 | Hannum et al. | 725/88 |
| 9,094,140 B2 * | 7/2015 | Tidwell | H04H 60/31 |
| 2003/0066092 A1 * | 4/2003 | Wagner et al. | 725/136 |
| 2003/0070182 A1 * | 4/2003 | Pierre et al. | 725/135 |
| 2004/0010808 A1 * | 1/2004 | deCarmo | 725/139 |
| 2005/0166230 A1 * | 7/2005 | Gaydou et al. | 725/41 |
| 2008/0022347 A1 * | 1/2008 | Cohen | 725/134 |
| 2008/0092181 A1 * | 4/2008 | Britt | 725/87 |

FOREIGN PATENT DOCUMENTS

| | | |
|---|---|---|
| JP | 2003-078900 A | 3/2003 |
| JP | 2003-230123 | 8/2003 |
| JP | 2004-282502 A | 10/2004 |
| JP | 2005-136974 | 5/2005 |

* cited by examiner

F I G. 4

| IDENTIFICATION ID | CHANNEL | PROGRAM TITLE | BROADCAST START DATE / TIME | BROADCAST TIME | |
|---|---|---|---|---|---|
| ID1 | Ch. A | MOVIE, **WAS++ | 2008/07/01 18:00:00 | 01:00:00 | ~T401 |
| ID2 | Ch. A | VARIETY△, TALK ABOUT □□□ | 2008/07/01 19:00:00 | 01:00:00 | ~T402 |
| ID3 | Ch. B | SIX O'CLOCK NEWS, FOLLOW-UP ON CASE ○○! | 2008/07/01 18:00:00 | 01:00:00 | ~T403 |
| ID4 | Ch. B | ANIMATION, ○○○○ COMES OUT AT LAST!? | 2008/07/01 19:00:00 | 00:30:00 | ~T404 |
| ... | ... | ... | ... | ... | |

| IDENTIFICATION ID | URI |
|---|---|
| ID1 | http://○○○.net/○○ ~T501 |
| ID2 | http://○○○.net/■■ ~T502 |
| ID3 | http://○○○.net/×× ~T503 |
| ⋮ | ⋮ |

FIG. 12
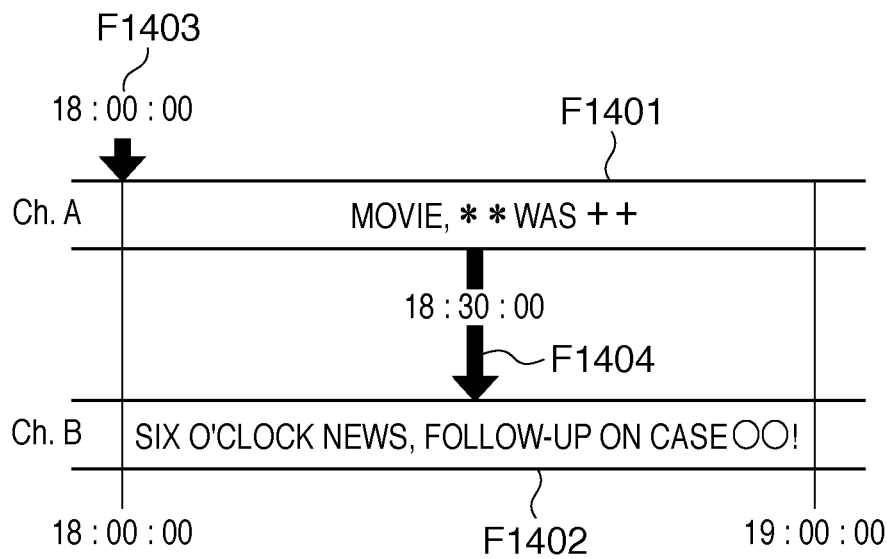
FIG. 13
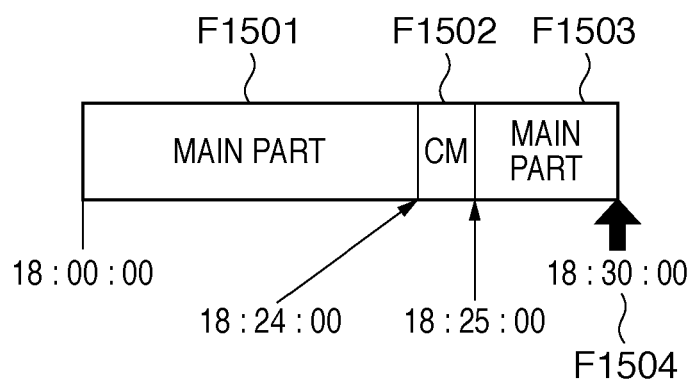
FIG. 14
| DATE / TIME | CHANNEL | |
|---|---|---|
| 2008/7/1  18:00:00 | Ch. A | ~T1601 |
| 2008/7/1  18:30:00 | Ch. B | ~T1602 |

FIG. 16

| CHANNEL SELECTION MANNER | IMMEDIATE DISPLAY FLAG | |
|---|---|---|
| SELECT CHANNEL USING EPG | IMMEDIATE DISPLAY ON | ~T1901 |
| SELECT CHANNEL DIRECTLY USING NUMBER BUTTON | IMMEDIATE DISPLAY ON | ~T1902 |
| SELECT CHANNEL BY INPUTTING NUMBER USING NUMBER BUTTONS | IMMEDIATE DISPLAY ON | ~T1903 |
| CHANNEL UP OPERATION | IMMEDIATE DISPLAY OFF | ~T1904 |
| CHANNEL DOWN OPERATION | IMMEDIATE DISPLAY OFF | ~T1905 |

FIG. 17

| | Col01 | Col02 | |
|---|---|---|---|
| | Ch. A | Ch. B | ... |
| Row01 / 18 | MOVIE, ** WAS ++ (Cell01) | SIX O'CLOCK NEWS, FOLLOW-UP ON CASE ○○! (Cell03) | ... |
| Row02 / 19 | VARIETY △, TALK ABOUT □□□ (Cell02) | ANIMATION, ○○○○ COMES OUT AT LAST!? (Cell04) | ... |
| ... | ... | ... | |

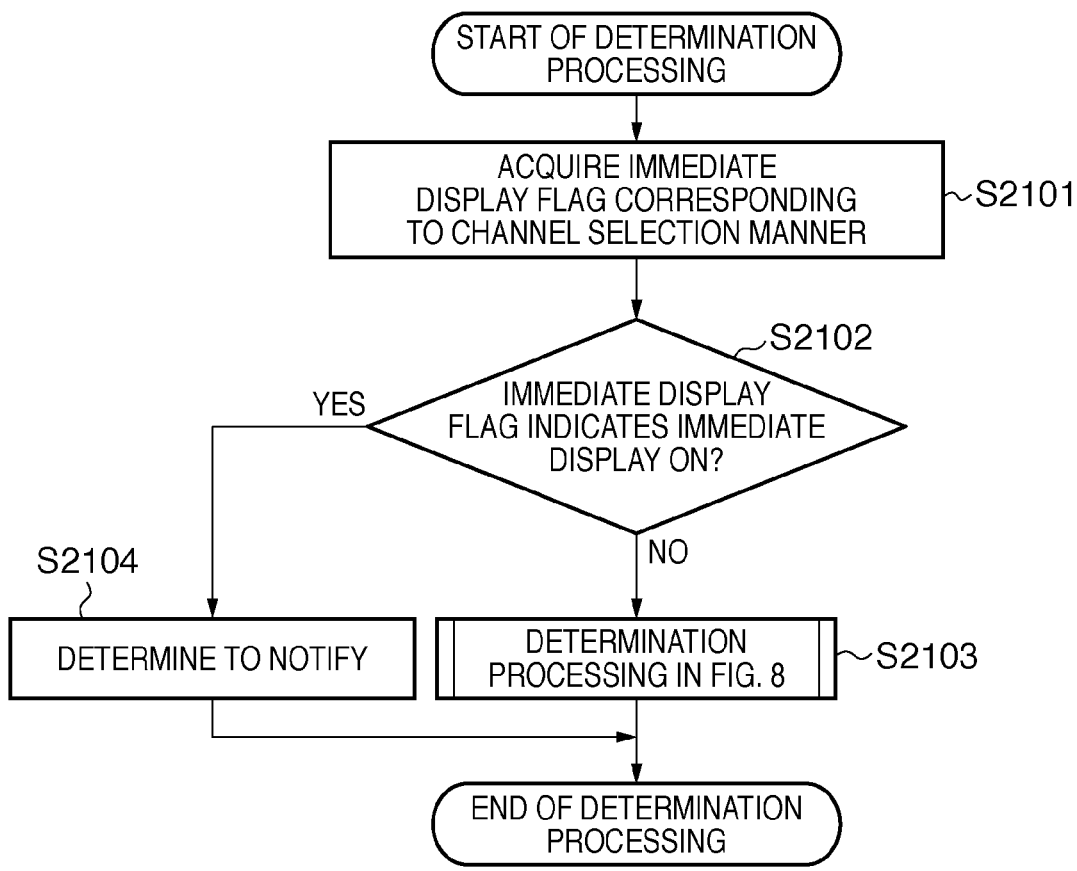

FIG. 22

| RECORDING START DATE / TIME | RECORDING TIME | CHANNEL | PROGRAM TITLE | |
|---|---|---|---|---|
| 2008/7/1 18:00:00 | 00:15:00 | Ch. A | MOVIE, **WAS++ | ~T2901 |
| 2008/6/24 18:00:00 | 01:00:00 | Ch. A | MOVIE,×× | ~T2902 |

F I G. 24

| IDENTIFICATION ID | CHANNEL | GENRE | PROGRAM TITLE | BROADCAST START DATE/TIME | BROADCAST TIME | |
|---|---|---|---|---|---|---|
| ID1 | Ch. A | MOVIE | MOVIE, **WAS++ | 2008/07/01 18:00:00 | 01:00:00 | ~T3201 |
| ID2 | Ch. A | VARIETY | VARIETY△, TALK ABOUT □□□ | 2008/07/01 19:00:00 | 01:00:00 | ~T3202 |
| ID3 | Ch. B | NEWS | SIX O'CLOCK NEWS, FOLLOW-UP ON CASE○○! | 2008/07/01 18:00:00 | 01:00:00 | ~T3203 |
| ID4 | Ch. B | ANIMATION | ANIMATION, ○○○○ COMES OUT AT LAST!? | 2008/07/01 19:00:00 | 00:30:00 | ~T3204 |
| ... | ... | ... | ... | ... | ... | |

| GENRE | NOTIFICATION NECESSITY FLAG | |
|---|---|---|
| MOVIE | NOTIFICATION IS NECESSARY | ~T3301 |
| VARIETY | NOTIFICATION IS UNNECESSARY | ~T3302 |
| NEWS | NOTIFICATION IS UNNECESSARY | ~T3303 |
| ANIMATION | NOTIFICATION IS NECESSARY | ~T3304 |
| MOVIE | NOTIFICATION IS NECESSARY | ~T3305 |
| ⋮ | ⋮ | |

CONTENT PLAYER AND METHOD OF CONTROLLING THE SAME

BACKGROUND OF THE INVENTION

Field of the Invention

The present invention relates to a content playback technique of notifying a user that it is possible to view, by video-on-demand (to be referred to as VOD hereinafter), a content identical to a broadcast content that he/she is viewing.

Description of the Related Art

Recently prosperous amalgamation of broadcasting and communications allows a VOD server to archive content identical to broadcast content and distribute it so that a user can view them using VOD during the same period of time as the broadcast. That is, VOD allows even a user who has viewed a broadcast content starting halfway through to view a content identical to the broadcast content from the beginning.

In, for example, Japanese Patent Laid-Open No. 2003-046984, when a user views a broadcast content starting halfway through the program, the opening part of the broadcast content is distributed via an individual channel based on a request from the user, and the broadcast content is accumulated simultaneously. When playback of the opening part on the individual channel has ended, playback of the accumulated broadcast content starts so that the user can view the content from the beginning.

In, for example, Japanese Patent Laid-Open No. 2005-136974, when a user has performed viewing operation such as rewind during broadcast content viewing, an archive is searched for a content identical to the given broadcast content. If such content exists, the reception path is switched to play back the archived content. In addition, the archive is searched for the content before the viewing operation. If content identical to the given broadcast content exists, executable viewing operations are displayed on a screen.

However, when nearly all broadcast content is archived, the user is then notified of the existence of the archived content each time he/she selects a channel and this may annoy the user. For example, during so-called "channel surfing" where a user quickly changes channels searching for a content, user notification is supposed to be unnecessary.

To solve this problem, Japanese Patent Laid-Open No. 2003-046984 describes a method of viewing a content from the beginning but not determining whether to notify the presence of archived content. However, Japanese Patent Laid-Open No. 2005-136974 cannot eliminate the above-described annoyance because screen display is performed when the existence of a content identical to a broadcast content has been detected.

SUMMARY OF THE INVENTION

In order to solve the aforementioned problems, the present invention attains a technique of determining whether to notify a user that viewing an archived content identical to a a broadcast content viewed starting halfway through allows the user to view the broadcast content from the beginning, thereby suppressing unnecessary notifications and eliminating annoyance.

The present invention provides a content player which receives a broadcast content transmitted by a broadcast wave and an information content distributed via a network and plays back a video image concerning a content, comprising: a channel selection unit configured to select a channel to view the broadcast content; an acquisition unit configured to acquire location information of an information content corresponding to the broadcast content on the channel selected by the channel selection unit; a detection unit configured to detect that the broadcast content on the selected channel has been viewed starting halfway; a determination unit configured to, if the detection unit has detected that the broadcast content has been viewed starting halfway, determine whether to notify that it is possible to view, from the beginning, the broadcast content that has been viewed starting halfway; and a notification unit configured to generate a notification image for notification when the determination unit has determined to notify.

The present invention also provides a content player which receives a broadcast content transmitted by a broadcast wave and an information content distributed via a network and plays back a video image concerning a content, comprising: a channel selection unit configured to select a channel to view the broadcast content; an acquisition unit configured to acquire location information of an information content corresponding to the broadcast content on the channel selected by the channel selection unit; a detection unit configured to detect that the broadcast content on the selected channel has been viewed starting halfway; a determination unit configured to, if the detection unit has detected that the broadcast content has been viewed starting halfway, determine whether to switch viewing from the broadcast content that has been viewed starting halfway to the information content corresponding to the broadcast content in accordance with a viewing history of the information content corresponding to the broadcast content; and a control unit configured to switch the content to be played back so as to play back the information content corresponding to the broadcast content from the beginning when the determination unit has determined to switch.

The present invention also provides a method of controlling a content player which receives a broadcast content transmitted by a broadcast wave and an information content distributed via a network and plays back a video image concerning a content, comprising the steps of: selecting a channel to view the broadcast content; acquiring location information of an information content corresponding to the broadcast content on the channel selected in the step of selecting the channel; detecting that the broadcast content on the selected channel has been viewed starting halfway; if it is detected in the step of detecting that the broadcast content has been viewed starting halfway, determining whether to notify that it is possible to view, from the beginning, the broadcast content that has been viewed starting halfway; and generating a notification image for notification when it is determined to notify in the step of determining.

The present invention also provides a method of controlling a content player which receives a broadcast content transmitted by a broadcast wave and an information content distributed via a network and plays back a video image concerning a content, comprising the steps of: selecting a channel to view the broadcast content; acquiring location information of an information content corresponding to the broadcast content on the channel selected in the step of selecting the channel; detecting that the broadcast content on the selected channel has been viewed starting halfway; if it is detected in the step of detecting that the broadcast content has been viewed starting halfway, determining whether to switch viewing from the broadcast content that has been viewed starting halfway to the information content corresponding to the broadcast content in accordance with a viewing history of the information content corresponding to the broadcast content; and switching the content to be played back so as to play back the information content corresponding to the broadcast content from the beginning when it is determined to switch in the step of determining.

The present invention also provides a content player which receives a broadcast content transmitted by a broadcast wave and an information content distributed via a network and plays back a video image concerning a content, comprising: a channel selection unit configured to select a channel to view the broadcast content; an acquisition unit configured to acquire location information of an information content corresponding to the broadcast content on the channel selected by the channel selection unit; a detection unit configured to detect that the broadcast content on the selected channel has been viewed starting halfway; a determination unit configured to, if the detection unit has detected that the broadcast content has been viewed starting halfway, determine whether to notify that it is possible to view, from the beginning, the broadcast content that has been viewed starting halfway; a notification unit configured to generate a notification image to cause a user to select whether to view the broadcast content from the beginning when the determination unit has determined to notify; and a control unit configured to, when the user has selected to view the broadcast content from the beginning, switch the broadcast content to the information content corresponding to the broadcast content and play back the information content based on the location information.

According to the present invention, upon detecting that a user is viewing a broadcast content starting halfway through, it is determined whether to notify the user that a content identical to the broadcast content exists in an archive, and viewing the content enables the user to view the broadcast content from the beginning. This suppresses unnecessary notifications and eliminates annoyance.

Further features of the present invention will become apparent from the following description of exemplary embodiments (with reference to the attached drawings).

BRIEF DESCRIPTION OF THE DRAWINGS

FIG. 4 is a view showing program attribute information stored in a program information management unit;

FIG. 12 is a view showing a timing of channel selection by a user;

FIG. 13 is a view showing the composition of a CM and the main part of a broadcast content;

FIG. 14 is a view showing a channel selection history stored in a notification control unit;

FIG. 16 is a view showing an immediate display flag;

FIG. 17 is a view showing part of an EPG image;

FIG. 18 is a flowchart illustrating determination processing;

FIG. 19 is a view showing viewing reservation information stored in a viewing reservation management unit;

FIG. 22 is a view showing recorded content information stored in a video recorder;

FIG. 24 is a view showing program attribute information stored in a program information management unit;

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

[First Embodiment]

Figure 1:
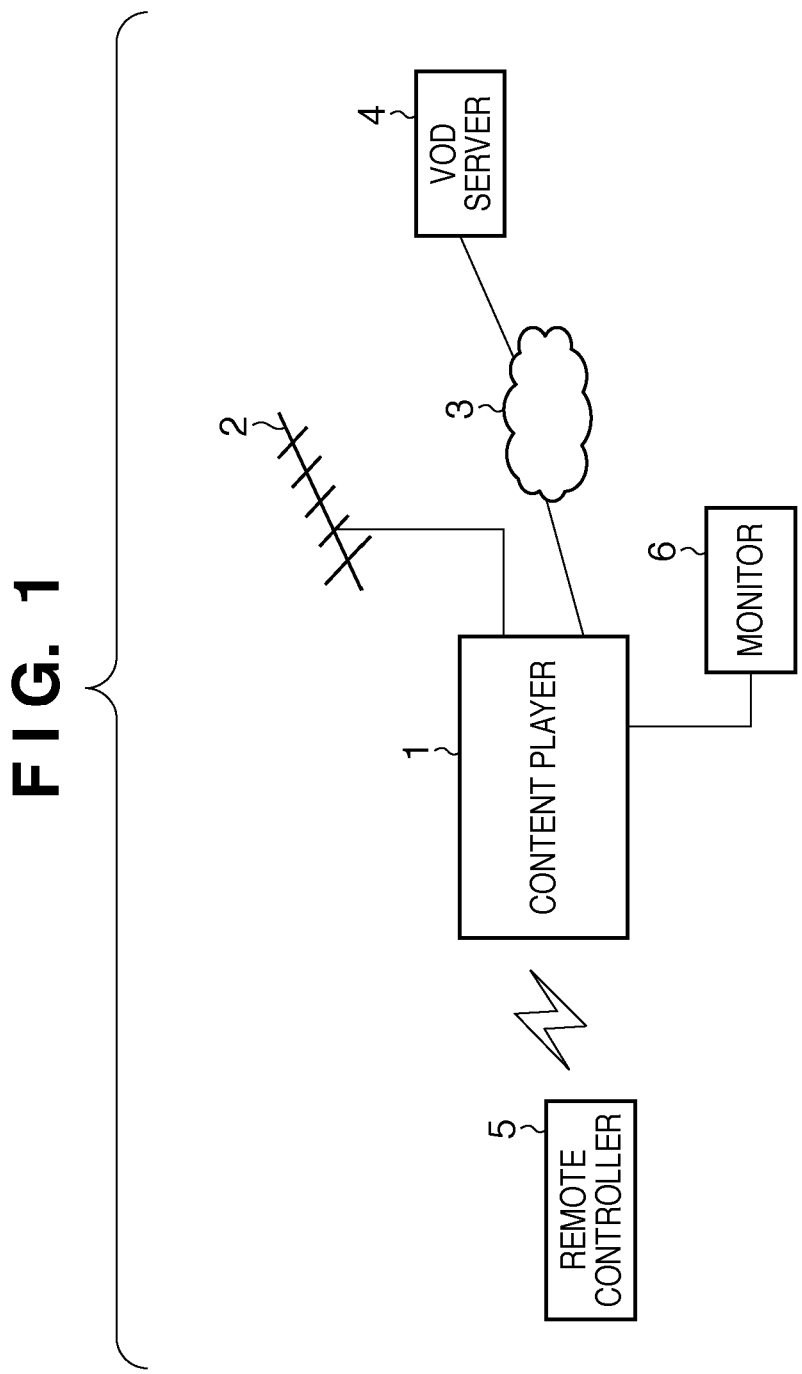
FIG. 1 is a view showing peripheral devices connected to a content player according to an embodiment of the present invention.

FIG. 1 is a view showing peripheral devices connected to a content player according to an embodiment of the present invention. Note that information content other than broadcast content archived in a VOD server will be referred to as VOD content hereinafter.

Referring to FIG. 1, a content player 1 is connected to an antenna 2 to receive a broadcast wave from a television transmission station (not shown). The content player 1 is also connected to the Internet 3 to search for a VOD content in a VOD server 4 connected to the Internet 3 and acquire the VOD content from the VOD server 4. A user operates a remote controller 5 to transmit, to the content player 1, a channel selection request, an electronic program guide (to be referred to as EPG hereinafter) display request, or a VOD content playback control request. Broadcast content, a VOD content, an EPG image, or a notification image indicating that a user can view, from the beginning, a broadcast content being viewed starting halfway through is displayed on a monitor 6.

Figure 2:
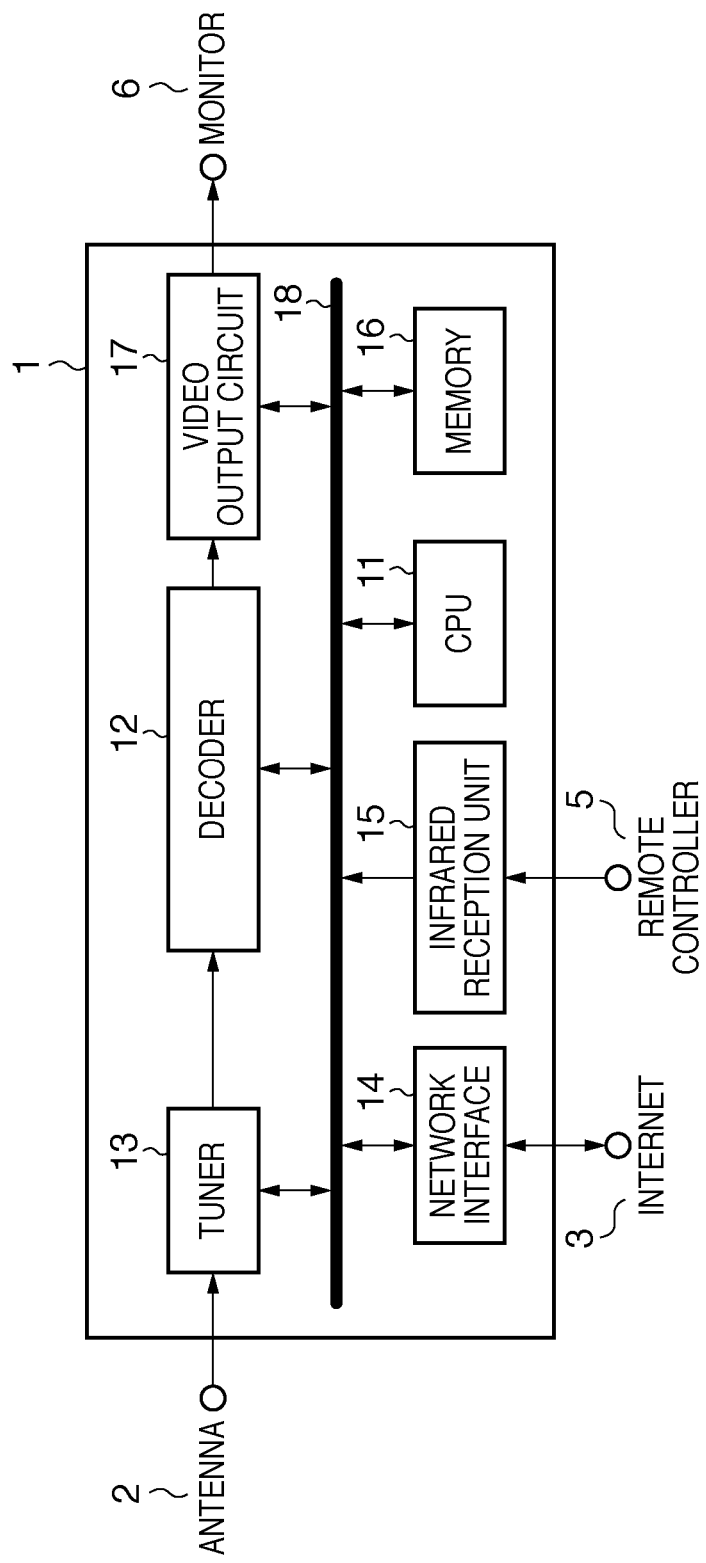
FIG. 2 is a functional block diagram of a content player according to the first embodiment.

FIG. 2 is a functional block diagram of the content player shown in FIG. 1.

Referring to FIG. 2, a CPU 11 controls the operation of the entire content player 1 and the units connected to an internal bus 18 based on the internal state of the apparatus and operation information acquired from an infrared reception unit 15. The CPU 11 also searches, via a network interface 14, for a content that is identical to a broadcast content and exists as a VOD content. The CPU 11 also accumulates operation information acquired from the infrared reception unit 15 in a memory 16 as an operation history and determines, based on the internal state of the content player 1, the presence/absence of an archive, and various kinds of information accumulated in the memory 16, whether to notify a user that it is possible to view a content from the beginning.

A decoder 12 receives a broadcast signal from a tuner 13 or a VOD content from the network interface 14, analyzes the received broadcast signal or VOD content, demultiplexes it into a video, audio, and data, and decodes the coded video and audio. The decoder 12 outputs the decoded video to a video output circuit 17 and stores, in the memory 16, program attribute information such as a program name, broadcast time, and metadata contained in the data. Note that audio data output from the decoder 12 is not illustrated.

The tuner 13 receives a broadcast wave and extracts a broadcast signal. Upon receiving a channel selection instruction from the CPU 11, the tuner 13 selects the instructed frequency, extracts a broadcast signal included in the frequency, and outputs it to the decoder 12. The tuner 13 corresponds to a terrestrial digital broadcast tuner and a BS/broadband CS digital broadcast tuner in a common digital TV set.

The network interface 14 connects the Internet 3 to the content player 1. a VOD content is transmitted to the decoder 12 via the network interface 14. The network interface 14 also outputs a VOD content search request from the CPU 11 to the Internet 3, receives a search result from the VOD server 4 in FIG. 1, and outputs it to the CPU 11. Note that in this embodiment, a VOD content is transmitted to the decoder 12, for the descriptive convenience. However, the network interface 14 may be configured to temporarily store the VOD content in the memory 16 so that the decoder 12 can read it out from the memory 16 as needed.

The infrared reception unit 15 receives an infrared signal transmitted from the remote controller 5 in accordance with a user operation and transmits the signal to the CPU 11. Note that in this embodiment, signal reception from the remote controller 5 is done using infrared rays. However, the present invention is not limited to this, and a radio signal or the like may be received.

The memory 16 temporarily stores data generated by the CPU 11 and other constituent circuits. Detailed examples of the memory 16 are an SRAM and a DRAM which can hold data only during power supply to the content player 1. Other examples are a flash memory and an EEPROM which can continuously hold recorded data even after power supply has been stopped.

The video output circuit 17 receives a video signal output from the decoder 12, converts it into a format suitable for the monitor 6, and outputs the signal. The video output circuit 17 also executes video signal output control processing to output the video signal to the monitor 6 in accordance with an output frame rate.

The internal bus 18 performs data transmission and reception among the units of the content player 1.

Figure 3:
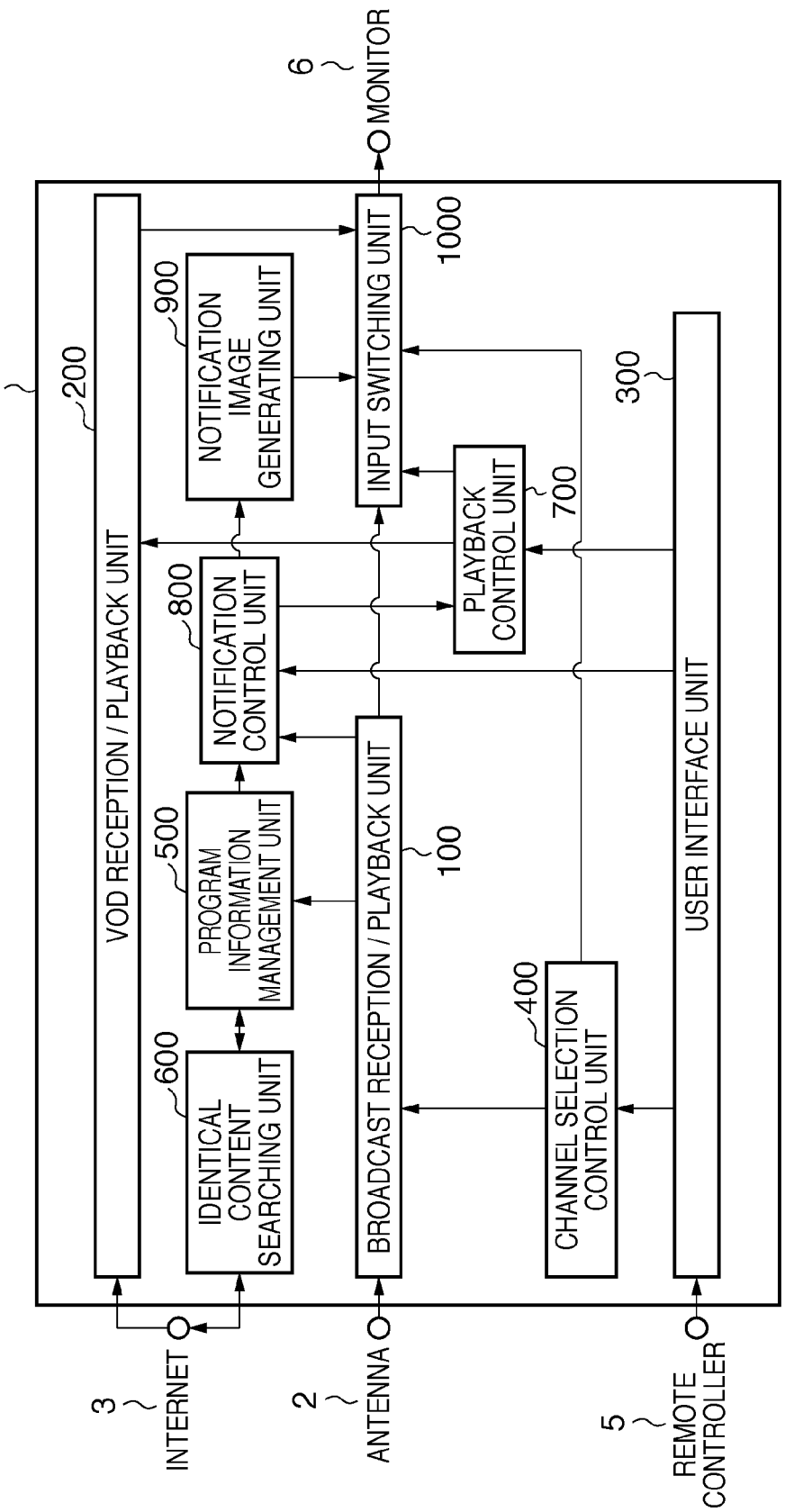
FIG. 3 is a functional block diagram of the content player according to the first embodiment.

FIG. 3 is a functional block diagram of the content player according to the first embodiment.

Referring to FIG. 3, a broadcast reception/playback unit 100 selects a channel based on a channel instructed by a channel selection control unit 400 and demultiplexes multiplexed program data in a broadcast wave received by the antenna 2 into video, audio, and data. The demultiplexed video and audio are decoded and output to the monitor 6 and a speaker (not shown) via an input switching unit 1000. The broadcast reception/playback unit 100 also extracts program attribute information from the data and outputs it to a program information management unit 500.

Program data is generated by multiplexing a video signal and audio signal of a program by the MPEG2 (the second standard of the color moving picture coding scheme standardization group) transport stream (TS) scheme. The video and audio demultiplexed by the broadcast reception/playback unit 100 have been compression-coded by MPEG2. Hence, the broadcast reception/playback unit 100 decodes them.

Program attribute information contains the identification ID, broadcast channel, program title, broadcast start date/time, and broadcast time of a broadcast content and is used to determine notification/non-notification or search for a VOD content. The broadcast reception/playback unit 100 manages the current date/time of the content player 1 based on the current time and current date contained in data, and upon receiving a request from a notification control unit 800, returns the current date/time. Upon receiving a selected channel from the channel selection control unit 400, the broadcast reception/playback unit 100 outputs the selected channel and the channel selection date/time indicating the date/time of channel selection reception to the notification control unit 800 as a channel selection notification.

A VOD reception/playback unit 200 receives a VOD content from the VOD server 4 on the Internet 3 using VOD content location information acquired from a playback control unit 700. The VOD reception/playback unit 200 also plays back the content in accordance with a VOD content playback request acquired from the playback control unit 700. If the video and audio of a VOD content have been compression-coded, the VOD reception/playback unit 200 decodes them. Location information is a URI (Uniform Resource Identifier) that is an identifier given to an information resource on the Internet. Playback control information is information associated with a playback instruction for, for example, opening part playback or scene playback based on a designated absolute position, a playback instruction for, for example, skip playback based on a designated relative position, or a special playback instruction for, for example, fast-forward or pause.

A user interface unit 300 receives an instruction such as "channel up" or "select Ch. A" from a user and outputs a channel selection request to the channel selection control unit 400 to perform an operation complying with the instruction. The user interface unit 300 also receives an instruction such as "view VOD content" from a user and outputs playback control information to the playback control unit 700 to perform an operation complying with the instruction. The user interface unit 300 also receives a user instruction for a notification image generated by a notification image generating unit 900 and outputs, to the notification control unit 800, a VOD viewing selection notification indicating that the user has selected VOD content viewing. Note that a user instruction is normally input via the remote controller and is sometimes accompanied with an operation screen including options such as "YES" and "NO".

The channel selection control unit 400 outputs a selected channel to the broadcast reception/playback unit 100 to select a channel based on a channel selection request received from the user interface unit 300. If a channel selection request is received during VOD content viewing, the channel selection control unit 400 outputs a switching instruction to the input switching unit 1000 to output the video of a broadcast content to the monitor 6.

The program information management unit 500 stores program attribute information about a broadcast content or a program to be aired. The program attribute information is periodically updated by the broadcast reception/playback unit 100. When program information is updated, the program information management unit 500 outputs the updated program attribute information to an identical content searching unit 600. The program information management unit 500 also receives VOD content location information that the identical content searching unit 600 has acquired from program attribute information, and stores it in association with the program attribute information. The program information management unit 500 also outputs the program attribute information and the VOD content location information based on a request from the notification control unit 800.

Upon receiving the updated program attribute information from the program information management unit 500, the identical content searching unit 600 searches, via the Internet 3, for a content which is identical to the broadcast content and is archived in the VOD server 4. If an archive exists, the identical content searching unit 600 acquires the location information of the VOD content and outputs it to the program information management unit 500. Note that in this embodiment, searching is performed every time program attribute information is updated. Instead, the identical content searching unit 600 may be configured to receive a channel selection notification from the broadcast reception/playback unit 100 and perform searching every time the user selects a channel.

Upon receiving playback control information from the user interface unit 300, the playback control unit 700 acquires the location information of a target VOD content from the notification control unit 800. The playback control unit 700 then outputs, to the VOD reception/playback unit 200, a VOD content playback request based on the playback control information and the VOD content location information and outputs a switching instruction to the input switching unit 1000 to output the video of the VOD content to the monitor 6.

Upon receiving a channel selection notification from the broadcast reception/playback unit 100, the notification control unit 800 acquires program attribute information and VOD content location information from the program information management unit 500. After that, the notification control unit 800 acquires the current date/time from the broadcast reception/playback unit 100 and determines whether to notify the user that viewing the VOD content enables him/her to view, from the beginning, the broadcast content which he/she is viewing. This determination processing will be explained later. To notify, the notification control unit 800 outputs a notification request to the notification image generating unit 900. The notification control unit 800 also receives a VOD viewing selection notification from the user interface unit 300 and stores it in association with broadcast content. The notification control unit 800 also outputs VOD content location information based on a request from the playback control unit 700.

The notification image generating unit 900 generates a notification image based on a notification request received from the notification control unit 800 and output the generated image to the input switching unit 1000.

The input switching unit 1000 switches a video to be output to the monitor 6 in accordance with a switching instruction from the channel selection control unit 400 or the playback control unit 700, and also stores information indicating the current output source, that is, a broadcast content or a VOD content. The input switching unit 1000 also superimposes a notification image output from the notification image generating unit 900 on a content and outputs it to the monitor 6.

FIG. 4 is a view showing program attribute information stored in the program information management unit 500.

Referring to FIG. 4, T401 represents that a broadcast content having an identification ID "ID1" and a program title "movie, ** was ++" will be airing on a channel "Ch. A" for "01:00:00" from "18:00:00 on Jul. 1, 2008".

T402 represents that a broadcast content having an identification ID "ID2" and a program title "variety Δ, talk about □□□" will be airing on the channel "Ch. A" for "01:00:00" from "19:00:00 on Jul. 1, 2008".

T403 represents that a broadcast content having an identification ID "ID3" and a program title "six o'clock news, follow-up on case ○○!" will be airing on a channel "Ch. B" for "01:00:00" from "18:00:00 on Jul. 1, 2008".

T404 represents that a broadcast content having an identification ID "ID4" and a program title "animation, ○○○○ comes out at last!?" will be airing on the channel "Ch. B" for "00:30:00" from "19:00:00 on Jul. 1, 2008".

Figures 5, 6:
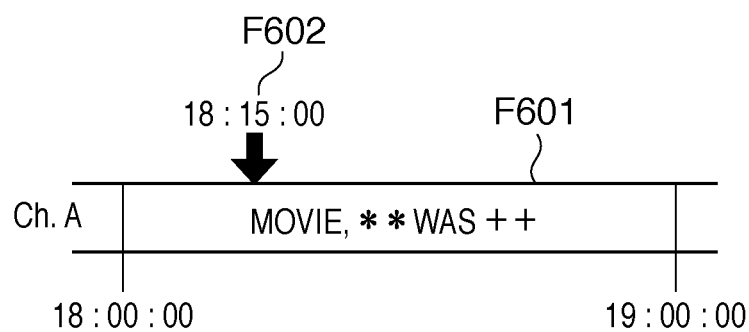
FIG. 5 is a view showing VOD content location information stored in the program information management unit.
FIG. 6 is a view showing a timing of channel selection by a user.

FIG. 5 is a view showing VOD content location information stored in the program information management unit 500.

Referring to FIG. 5, T501 represents that the URI of a VOD content having an identification ID "ID1" is "http://○○○.net/○○".

T502 represents that the URI of a VOD content having an identification ID "ID2" is "http://○○○.net/■■".

T503 represents that the URI of a VOD content having an identification ID "ID3" is "http://○○○.net/xx".

The pieces of program attribute information shown in FIG. 4 and the pieces of VOD content location information shown in FIG. 5 are associated by the identification IDs. In this case, VOD content exists in correspondence with the broadcast content having the identification IDs "ID1", "ID2", and "ID3". However, no VOD content exists for the broadcast content having the identification ID "ID4".

FIG. 6 shows the timing of user's selection of the channel "Ch. A" on Jul. 1, 2008 when the program attribute information in FIG. 4 and the VOD content location information in FIG. 5 are stored.

FIG. 6 represents that the user could not view the broadcast content "movie, ** was ++" from the beginning because he/she selected the channel at time "18:15:00" F602 during a broadcast time F601 of the content. Note that the user has not performed remote control then.

Figure 7:
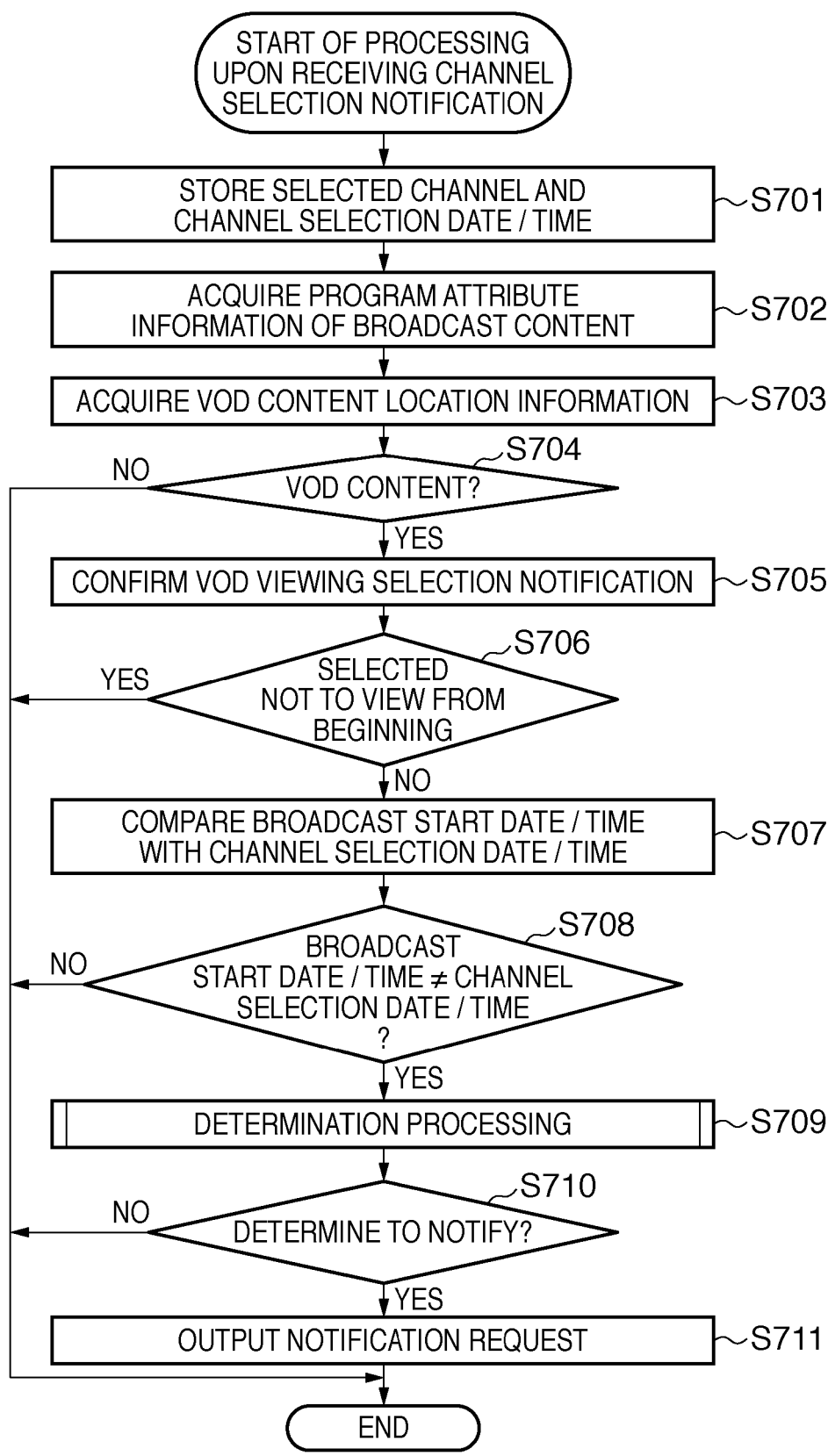
FIG. 7 is a flowchart illustrating the operation of a notification control unit upon receiving a channel selection notification.

FIG. 7 is a flowchart illustrating the operation of the notification control unit 800 upon receiving a channel selection notification from the broadcast reception/playback unit 100. This will be described below based on the operation shown in FIG. 6.

Upon receiving a channel selection notification from the broadcast reception/playback unit 100, the notification control unit 800 stores the selected channel "Ch. A" and the channel selection date/time "Jul. 1, 2008 18:15:00" contained in the channel selection notification (S701).

Next, the notification control unit 800 acquires program attribute information about the broadcast content "movie, ** was ++" the user is viewing from the program information management unit 500 based on the selected channel and the channel selection time (S702).

The notification control unit 800 then acquires VOD content location information associated with the broadcast content the user is viewing based on the identification ID "ID1" in the program attribute information (S703). In this case, since the VOD content location information "http:// ◯◯◯.net/◯◯" is acquired, the notification control unit 800 determines that a VOD content exists (YES in step S704) and confirms a VOD viewing selection notification associated with the broadcast content (S705). This processing has not been performed before "Jul. 1, 2008 18:15:00". For this reason, no VOD viewing selection notification associated with the broadcast content exists, and the notification control unit 800 determines that "the user has not selected yet not to view the broadcast content from the beginning" (NO in step S706).

After that, the notification control unit 800 compares the broadcast start date/time "Jul. 1, 2008 18:00:00" contained in the acquired program attribute information with the channel selection date/time (S707). In this case, since the broadcast start date/time does not coincide with the channel selection date/time (YES in step S708), the notification control unit 800 determines that the user has not viewed the broadcast content from the beginning.

The notification control unit 800 then performs determination processing to be described later to determine whether to display a notification image (S709). Upon determining to notify (YES in step S710), the notification control unit 800 outputs a notification request to the notification image generating unit 900 (S711). On the other hand, upon determining not to notify (NO in step S710), no notification request is output.

If no VOD content associated with the broadcast content the user is viewing exists (NO in step S704), no notification request is output. In addition, no notification request is output either if the user has already selected not to view the broadcast content from the beginning (YES in step S706), or upon determining that the user has viewed the broadcast content from the beginning because of coincidence between the broadcast start date/time of the broadcast content and the channel selection date/time (NO in step S708).

Figure 8:
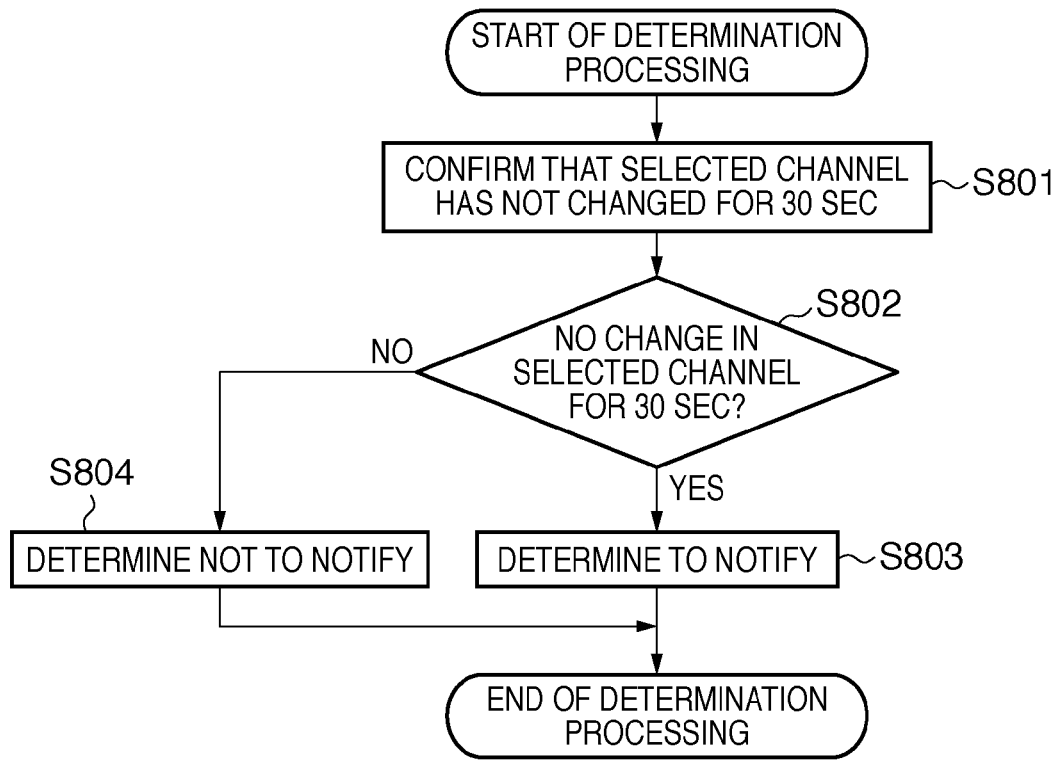
FIG. 8 is a flowchart illustrating determination processing.

FIG. 8 is a flowchart illustrating the determination processing in step S709 of FIG. 7. This will also be explained based on the operation shown in FIG. 6, like the description of FIG. 7.

First, the notification control unit 800 confirms that the selected channel has not changed for a predetermined time, for example, 30 sec or longer (S801). The user has not performed the channel selection operation from F602 in FIG. 6. This corresponds to the case in which the selected channel has not changed for 30 sec (YES in step S802). The notification control unit 800 therefore determines to notify the user (S803).

Assume that another channel has been selected within 30 sec from F602 in FIG. 6. This corresponds to NO in step S802, and the notification control unit 800 determines not to notify the user (S804).

Figure 9:
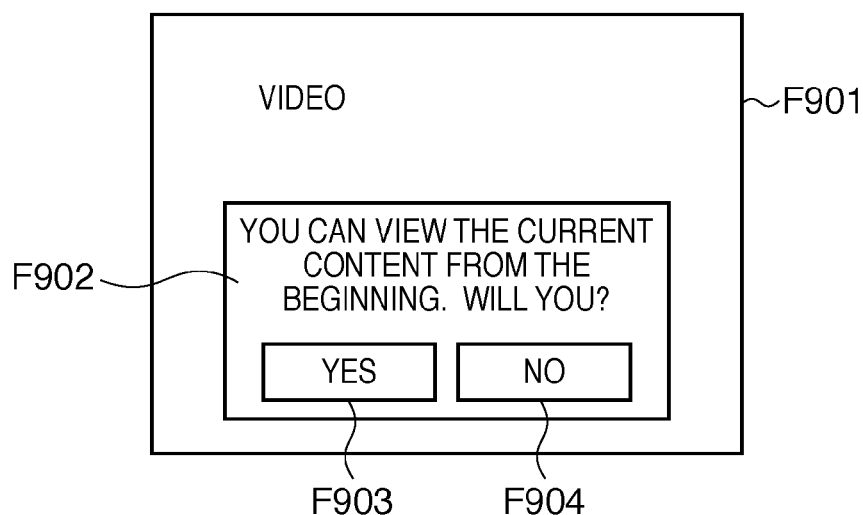
FIG. 9 is a view showing a notification image generated by a notification image generating unit.

FIG. 9 illustrates a display example of the notification image generated by the notification image generating unit 900 based on the notification request output from the notification control unit 800.

The input switching unit 1000 superimposes notification images F902 to F904 generated by the notification image generating unit 900 on a video F901 received from the broadcast reception/playback unit 100 and outputs them.

F903 indicates a button to be selected by the user to view a VOD content. F904 indicates a button to be selected by the user to continue viewing a broadcast content.

When the user has selected to view a VOD content using the remote controller 5 (pressed the button F903), the user interface unit 300 outputs, to the playback control unit 700, playback control information to play back the VOD content. This allows viewing of the VOD content. At this time, "the user has already selected to view the content from the beginning" is output to the notification control unit 800 as a VOD viewing selection notification.

On the other hand, if the user has selected to continue viewing the broadcast content using the remote controller 5 (pressed the button F904), the image F902 is closed to continue viewing the broadcast content. "The user has already selected not to view the content from the beginning" is output to the notification control unit 800 as a VOD viewing selection notification.

In this way, based on the date/time the user has selected the channel of a broadcast content and the viewing time of the broadcast content, it is determined whether to notify the user of the existence of an archived content identical to the broadcast content. This makes it possible to, for example, suppress notifications during user's zapping and eliminate annoyance.

Note that in this embodiment, when the broadcast start date/time coincides with the channel selection date/time, it is determined that the user has viewed a broadcast content from the beginning. However, it may be determined that the user has viewed a broadcast content from the beginning when the channel selection date/time is included within predetermined times before and after the broadcast start date/time.

In this embodiment, when the selected channel has not changed for 30 sec, it is determined to notify the user. However, the time may have any other value or arbitrarily be set by the user.

[Second Embodiment]

In the second embodiment, a user selects a channel in advance to view a broadcast content which will air after the current broadcast content airs. Note that a description of the same parts as in the first embodiment will not be repeated.

In a content player according to the second embodiment, a notification control unit 800 determines, using the broadcast start date/time, broadcast time, and channel selection date/time of a broadcast content, whether to notify a user that viewing a VOD content enables him/her to view, from the beginning, the broadcast content he/she is viewing, in addition to the functions described in the first embodiment. This determination processing will be explained later.

Figure 10:
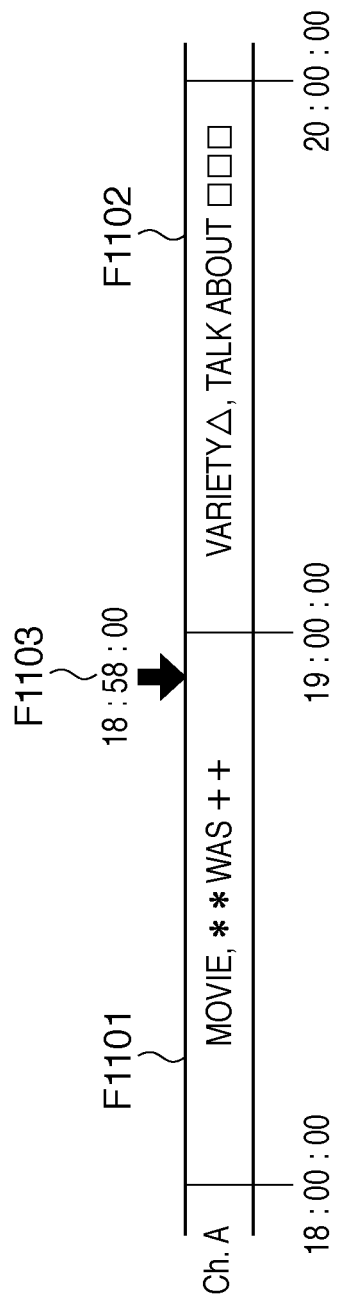
FIG. 10 is a view showing a timing of channel selection by a user.

FIG. 10 shows the timing of user's selection of a channel "Ch. A" on Jul. 1, 2008 when the program attribute information in FIG. 4 and the VOD content location information in FIG. 5 are stored.

In FIG. 10, the user is going to view, from the beginning, a broadcast content "variety Δ, talk about ☐☐☐" F1102 which will start at time "19:00:00". For this purpose, the user has selected the channel at time "18:58:00" F1103 during a broadcast time F1101 of a broadcast content "movie, ** was ++". Note that the user has not performed remote control then.

Figure 11:
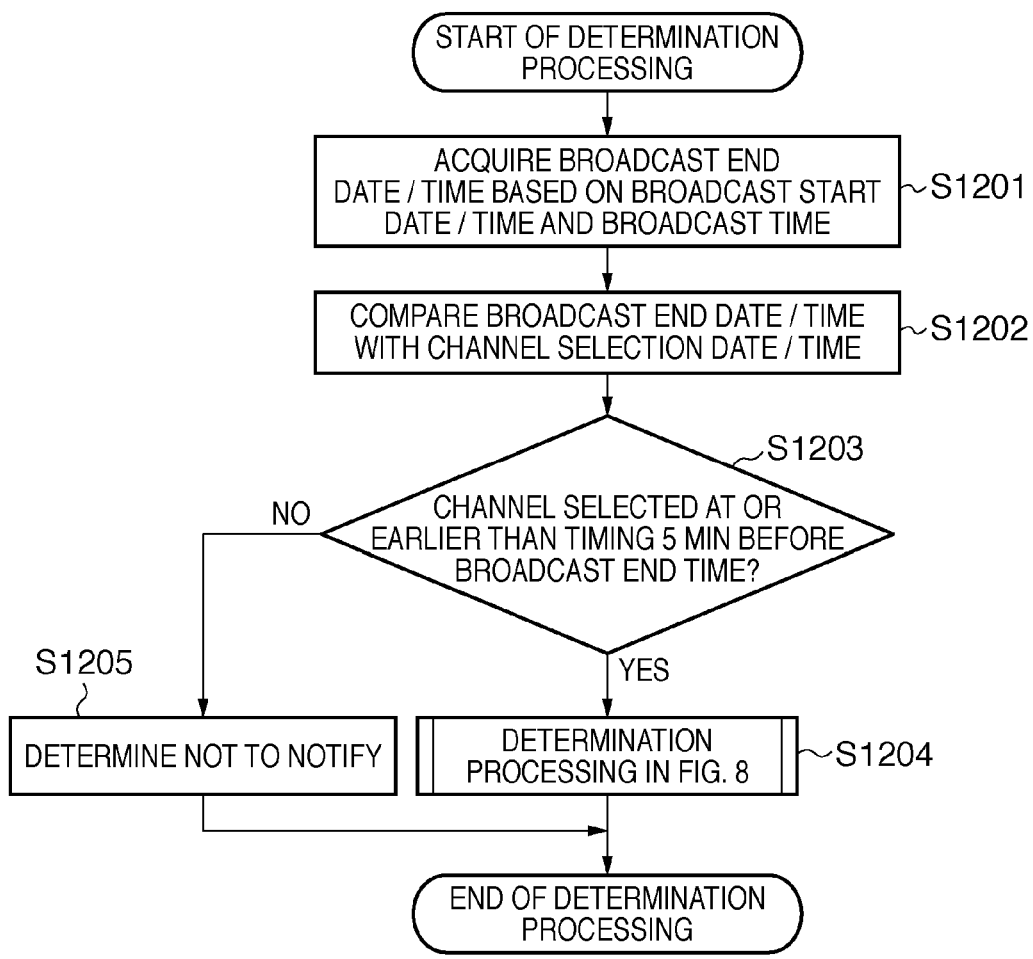
FIG. 11 is a flowchart illustrating determination processing.

FIG. 11 is a flowchart illustrating determination processing the notification control unit 800 performs in step S709 of FIG. 7 in place of the processing shown in the flowchart of FIG. 8. This will be described below based on the operation shown in FIG. 10.

First, the notification control unit 800 acquires the broadcast end date/time "Jul. 1, 2008 19:00:00" based on the broadcast start date/time and broadcast time of the broadcast content (S1201). The notification control unit 800 compares the broadcast end date/time with the channel selection date/time (S1202). The channel selection date/time is "Jul. 1, 2008 18:58:00". The difference between the broadcast end date/time and the channel selection date/time is "00:02:00". The notification control unit 800 determines that the user has selected the channel after the timing 5 min before the broadcast end time (NO in step S1203) and consequently determines not to notify the user (S1205).

On the other hand, assume that the user has selected the channel at "Jul. 1, 2008 18:50:00". The difference between the broadcast end date/time and the channel selection date/time is "00:10:00". The notification control unit 800 determines that the user has selected the channel at or earlier than a timing a predetermined time, that is, 5 min before the broadcast end time (YES in step S1203). Hence, the notification control unit 800 executes the determination processing in FIG. 8 (S1204). After the broadcast content has been viewed for 30 sec, the notification control unit 800 notifies the user.

In this way, if the date/time the user has selected the channel of a broadcast content is immediately before the broadcast end time, the user is not notified of the existence of an archived content identical to the broadcast content. This eliminates annoyance.

Note that in this embodiment, if channel selection has not been done at or earlier than a timing 5 min before the broadcast end time, user notification is prohibited. However, the time may have any other value or arbitrarily be set by the user.

[Third Embodiment]

In the third embodiment, coming across a commercial (to be referred to as a CM hereinafter) during viewing of a broadcast content or being interested in content airing on other channels, a user temporarily selects another channel. Note that a description of the same parts as in the first and second embodiments will not be repeated.

A content player according to the third embodiment, a broadcast reception/playback unit 100 stores, as a channel selection history, the history of selected channels received from a channel selection control unit 400 and the selected channel reception dates/times and outputs the history to a notification control unit 800, in addition to the functions described in the first embodiment. The broadcast reception/playback unit 100 also has a CM detection function and outputs, to the notification control unit 800, information indicating whether a broadcast content viewed immediately before channel selection is a CM. A known CM detection function detects a CM using switching of a video signal or an audio signal. In this embodiment, however, details of the CM detection function are not defined.

The notification control unit 800 acquires, from the broadcast reception/playback unit 100, the channel selection history and information indicating whether a broadcast content viewed immediately before channel selection is a CM, in addition to the functions described in the first embodiment. Furthermore, based on the broadcast start date/time of a broadcast content, the current date/time, a channel selection date/time, a channel selection history, and whether a broadcast content viewed immediately before channel selection is a CM, the notification control unit 800 determines whether to notify a user that viewing a VOD content enables him/her to view, from the beginning, the broadcast content he/she is viewing. This determination processing will be described later.

FIG. 12 shows the timings of user's selection of channels "Ch. A" and "Ch. B" on Jul. 1, 2008 when the program attribute information in FIG. 4 and the VOD content location information in FIG. 5 are stored.

In FIG. 12, the user has selected a broadcast content "movie, ** was ++" F1401 at time "18:00:00" F1403 and started viewing. Then, the user selects the channel "Ch. B" at time "18:30:00" F1404 and starts viewing a broadcast content "six o'clock news, follow-up on case ○○!" F1402 starting halfway through.

FIG. 13 illustrates the composition of a CM F1502 and the main part of the broadcast content "movie, ** was ++" F1501, F1503 up to the time "Jul. 1, 2008 18:30:00" F1504 the user selects the channel "Ch. B" in FIG. 12.

Referring to FIG. 13, the main part of the broadcast content is airing from time "18:00:00" to "18:24:00" F1501 and from time "18:25:00" F1503. The CM F1502 is airing from time "18:24:00" to "18:25:00". Hence, when the user has selected the channel "Ch. B", the main part of the broadcast content "movie, ** was ++" F1503 is airing.

FIG. 14 shows a channel selection history stored in the notification control unit 800 at the point of time F1404 in FIG. 12.

T1601 represents that the user selected the channel "Ch. A" at the date/time "Jul. 1, 2008 18:00:00". T1602 represents that the user selected the channel "Ch. B" at the date/time "Jul. 1, 2008 18:30:00".

Figure 15:
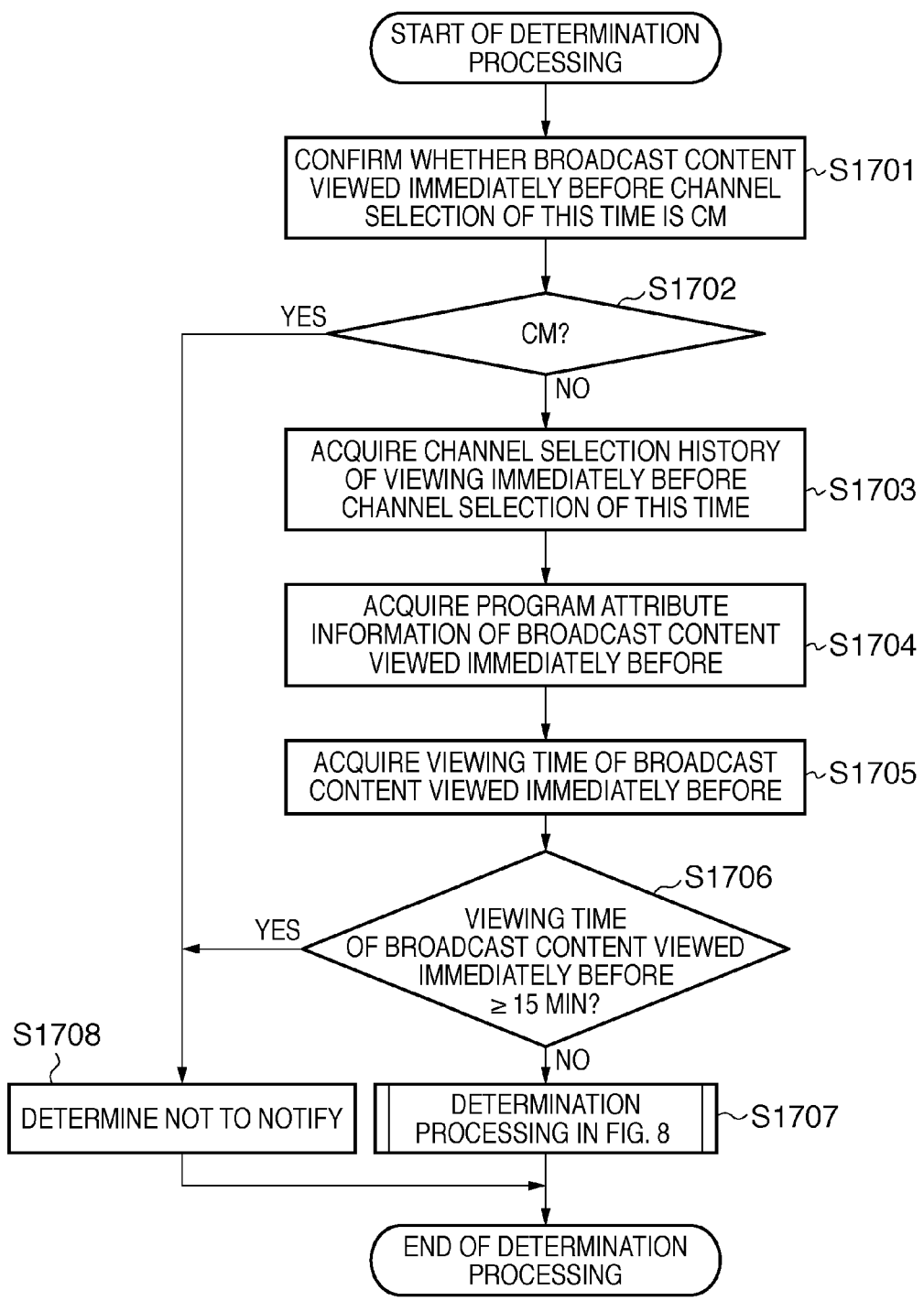
FIG. 15 is a flowchart illustrating determination processing.

FIG. 15 is a flowchart illustrating determination processing the notification control unit 800 performs in step S709 of FIG. 7 in place of the processing shown in the flowchart of FIG. 8. This will be described below based on the operation shown in FIGS. 12 to 14.

First, the notification control unit 800 confirms based on information from the broadcast reception/playback unit 100 whether the broadcast content viewed immediately before channel selection of this time is a CM (S1701). In the example of FIG. 13, the user has viewed the main part of the broadcast content immediately before. Hence, the notification control unit 800 determines that no CM has been viewed (NO in step S1702).

Next, the notification control unit 800 acquires the channel selection history of viewing immediately before channel selection of this time (S1703). In the example of FIG. 14, the channel selection history immediately before is "Jul. 1, 2008 18:00:00", channel "Ch. A".

After that, based on the acquired channel selection history, the notification control unit 800 acquires the program attribute information of the broadcast content viewed immediately before (S1704). In addition, based on the broadcast start date/time "Jul. 1, 2008 18:00:00" of the broadcast content viewed immediately before and the date/time of the channel selection history immediately before, the notification control unit 800 acquires the viewing time of the broadcast content viewed immediately before (S1705). In this case, the viewing time of the broadcast content viewed immediately before is "00:30:00". Hence, the notification control unit 800 determines the viewing time of the broadcast content viewed immediately before as 15 min or more (YES in step S1706) and consequently determines not to notify the user (S1708).

On the other hand, assume that the user has selected the channel "Ch. B" at "Jul. 1, 2008 18:24:30". In the example of FIG. 13, the notification control unit 800 determines that a CM has been viewed (YES in step S1702), and user notification will be prohibited. Assume that the user has selected the channel "Ch. B" at "Jul. 1, 2008 18:10:00". The viewing time of the broadcast content viewed immediately before is "00:10:00". For this reason, the notification control unit 800 determines the viewing time of the broadcast content viewed immediately before is shorter than 15 min (NO in step S1706). The notification control unit 800 consequently executes the determination processing in FIG. 8 (S1707). After the broadcast content has been viewed for 30 sec, the notification control unit 800 notifies the user.

In this way, based on whether the user has viewed a CM immediately before channel selection or whether the user has viewed the broadcast content for a predetermined time or more immediately before, it is determined whether to notify the user of the existence of an archived content identical to a broadcast content. When the user has temporarily selected a channel because, for example, a CM inserted during viewing of a broadcast content or an interest in news during viewing of a drama, user notification is prohibited. This eliminates annoyance.

Note that in this embodiment, if the viewing time of the broadcast content viewed immediately before is 15 min or more, user notification is prohibited. However, the time may arbitrarily be set by the user.

[Fourth Embodiment]

In the fourth embodiment, based on a channel selection manner used by a user to view a broadcast content, it is determined whether to notify the user of the existence of an archived content identical to the broadcast content. Note that a description of the same parts as in the first to third embodiments will not be repeated.

A content player according to the fourth embodiment includes an EPG display unit in addition to the arrangement shown in FIG. 3. A broadcast reception/playback unit 100 receives a channel selection manner from a channel selection control unit 400 and outputs it to a notification control unit 800 together with a channel selection notification, in addition to the functions described in the first embodiment.

A user interface unit 300 outputs a channel selection manner such as "channel up", "direct channel selection by number button", or "channel selection using EPG" together with a channel selection request, in addition to the functions described in the first embodiment. The user interface unit 300 also outputs an EPG display request or an EPG operation request such as cursor move or broadcast content selection on the EPG image to the EPG display unit based on a user operation. Note that upon receiving a channel selection request from the EPG display unit, the user interface unit 300 outputs the received channel selection request to the channel selection control unit 400.

The channel selection control unit 400 outputs, to the broadcast reception/playback unit 100, a channel selection manner received from the user interface unit 300 together with a selected channel, in addition to the functions described in the first embodiment.

A program information management unit 500 outputs program attribute information based on a request from the EPG display unit, in addition to the functions described in the first embodiment.

The notification control unit 800 acquires a channel selection manner from the broadcast reception/playback unit 100 as well as a channel selection notification, in addition to the functions described in the first embodiment. Furthermore, based on the broadcast start date/time of a broadcast content, the current date/time, a channel selection date/time, and a channel selection manner, the notification control unit 800 determines whether to notify a user that viewing a VOD content enables him/her to view, from the beginning, the broadcast content he/she is viewing. This determination processing will be described later.

An input switching unit 1000 receives an EPG image from the EPG display unit, switches a video to be output, and outputs the EPG image from the EPG display unit to a monitor 6, in addition to the functions described in the first embodiment. When the EPG display unit has ended outputting the EPG image, the input switching unit 1000 outputs, to the monitor 6, a broadcast content or a VOD content which has been output before output of the EPG image.

Upon receiving an EPG display request from the user interface unit 300, the EPG display unit acquires program attribute information from the program information management unit 500, generates an EPG image, and outputs it to the input switching unit 1000. If channel selection has been done based on an EPG operation request received from the user interface unit 300, the EPG display unit outputs a channel selection request to the user interface unit 300. Note that to close the EPG image based on an EPG operation request received from the user interface unit 300, the EPG display unit ends outputting the EPG image to the input switching unit 1000.

FIG. 16 shows the correspondence between each channel selection manner and an immediate display flag indicating whether to display a notification image immediately after channel selection.

T1901 represents that if the user has selected a channel using the EPG, the notification image is immediately displayed. T1902 represents that if the user has selected a channel directly using a number button, the notification image is immediately displayed.

T1903 represents that if the user has selected a channel by inputting a number corresponding to the channel using the number buttons, the notification image is immediately displayed.

On the other hand, T1904 represents that if the user has preformed a channel up operation, the notification image is not immediately displayed. T1905 represents that if the user has performs a channel down operation, the notification image is not immediately displayed.

FIG. 17 illustrates part of an EPG image which is displayed at time "Jul. 1, 2008 18:15:00" with the program attribute information shown in FIG. 4. The ordinate of the EPG image represents the time. A row Row01 displays broadcast content to be airing from time "18:00:00" to time "19:00:00". A row Row02 displays broadcast content to be airing from time "19:00:00" to time "20:00:00". The abscissa represents channels. A column Col01 displays broadcast content to be airing on a channel "Ch. A". A column Col02 displays broadcast content to be airing on a channel "Ch. B". Hence, a cell Cell01 displays a broadcast content "movie,  was ++" in FIG. 4. A cell Cell02 displays a broadcast content "variety Δ, talk about ☐☐☐". A cell Cell03 displays a broadcast content "six o'clock news, follow-up on case ○○!". A cell Cell04** displays a broadcast content "animation, ○○○○ comes out at last!?".

FIG. 18 is a flowchart illustrating determination processing the notification control unit 800 performs in step S709 of FIG. 7 in place of the processing shown in the flowchart of FIG. 8. A case will be described below in which the user selects the channel of the broadcast content "movie,  was ++" on the EPG image shown in FIG. 17** at time "Jul. 1, 2008 18:15:00".

First, based on a received channel selection manner, the notification control unit 800 acquires a corresponding immediate display flag from FIG. 16 (S2101). In this case, selecting the channel on the EPG image corresponds to T1901 in FIG. 16. Hence, the notification control unit 800 determines that the immediate display flag indicates "immediate display on" (YES in step S2102) and consequently determines to notify the user (S2104).

Direct channel selection using a number button without displaying the EPG image corresponds to T1902 in FIG. 16. Selecting a channel by inputting a number corresponding to the channel using the number buttons corresponds to T1903 in FIG. 16. In these cases, the notification control unit 800 acquires the immediate display flag indicating "immediate display on". Channel selection by a channel up operation corresponds to T1904 in FIG. 16. Channel selection by a channel down operation corresponds to T1905 in FIG. 16. In these cases, the notification control unit 800 acquires the immediate display flag indicating "immediate display off". Since the immediate display flag does not indicate "immediate display on" (NO in step S2102), the notification control unit 800 executes the determination processing in FIG. 8 (S2103). After the broadcast content has been viewed for 30 sec, the notification control unit 800 notifies the user.

In this way, based on a channel selection manner used by the user to view a broadcast content, it is determined whether to notify the user of the existence of an archived content identical to a broadcast content. When the user has directly selected a channel using, for example, the EPG or number keys with a will to view a broadcast content, notification is performed. During, for example, zapping, notification is prohibited. This eliminates annoyance.

Note that in this embodiment, the correspondence between the channel selection manner and the immediate display flag is set as shown in FIG. 16. However, the correspondence between the channel selection manner and the immediate display flag may arbitrarily be set by the user.

[Fifth Embodiment]

In the fifth embodiment, based on a viewing reservation made by a user, it is determined whether to notify the user of the existence of an archived content identical to the broadcast content. Note that a description of the same parts as in the first to fourth embodiments will not be repeated.

A content player according to the fifth embodiment includes a viewing reservation management unit in addition to the arrangement shown in FIG. 3. A broadcast reception/playback unit 100 outputs the current date/time to the viewing reservation management unit, in addition to the functions described in the first embodiment.

A user interface unit 300 outputs a broadcast content viewing reservation request to the viewing reservation management unit based on a viewing reservation operation performed by a user, in addition to the functions described in the first embodiment. The user interface unit 300 also outputs a broadcast content viewing reservation cancel request to the viewing reservation management unit based on a viewing reservation cancel operation performed by a user.

A channel selection control unit 400 outputs a selected channel to the broadcast reception/playback unit 100 to select a channel complying with a channel selection request received from the viewing reservation management unit, in addition to the functions described in the first embodiment.

A program information management unit 500 outputs program attribute information based on a request from the viewing reservation management unit, in addition to the functions described in the first embodiment.

A notification control unit 800 acquires viewing reservation information from the viewing reservation management unit, in addition to the functions described in the first embodiment. Furthermore, based on the broadcast start date/time of a broadcast content, the current date/time, a channel selection date/time, and viewing reservation information, the notification control unit 800 determines whether to notify a user that viewing a VOD content enables him/her to view, from the beginning, the broadcast content he/she is viewing. This determination processing will be described later.

The viewing reservation management unit acquires program attribute information from the program information management unit 500 and stores viewing reservation information based on a viewing reservation request received from the user interface unit 300. The viewing reservation management unit also outputs viewing reservation information based on a request from the notification control unit 800. The viewing reservation management unit also acquires the current date/time from the broadcast reception/playback unit 100 and outputs a channel selection request in accordance with the start of broadcast of a broadcast content reserved for viewing. On the other hand, the viewing reservation management unit deletes viewing reservation information about a broadcast content whose broadcast has ended. The viewing reservation management unit also deletes viewing reservation information based on a viewing reservation cancel request received from the user interface unit 300.

FIG. 19 shows viewing reservation information stored in the viewing reservation management unit at time "Jul. 1, 2008 18:15:00" with the program attribute information shown in FIG. 4.

T2301 represents that a reservation has been made to view a broadcast content to be airing on a channel "Ch. A" for a broadcast time "01:00:00" from a broadcast start date/time "2008/07/01 18:00:00". According to the program attribute information in FIG. 4, the viewing reservation information indicated by T2301 corresponds to "movie, ** was ++".

Figure 20:
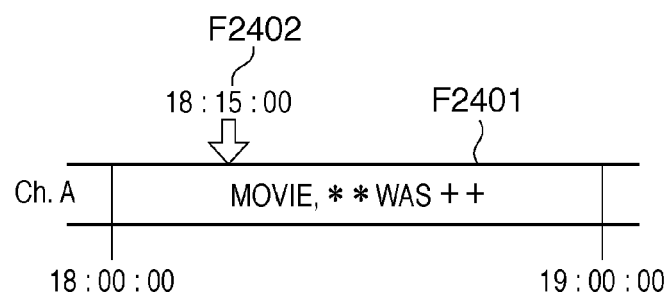
FIG. 20 is a view showing a timing of content player power on and channel selection by a user.

FIG. 20 shows the timing a user powers on a content player 1 and selects the channel "Ch. A" on Jul. 1, 2008 when the program attribute information in FIG. 4, the VOD content location information in FIG. 5, and the viewing reservation information in FIG. 19 are stored.

Referring to FIG. 20, the user powers on the content player 1 and selects the channel at time "18:15:00" during a broadcast time F2401 of the broadcast content "movie,  was ++", as indicated by F2402**. This indicates that the user could not view the broadcast content from the beginning regardless of the viewing reservation.

Figure 21:
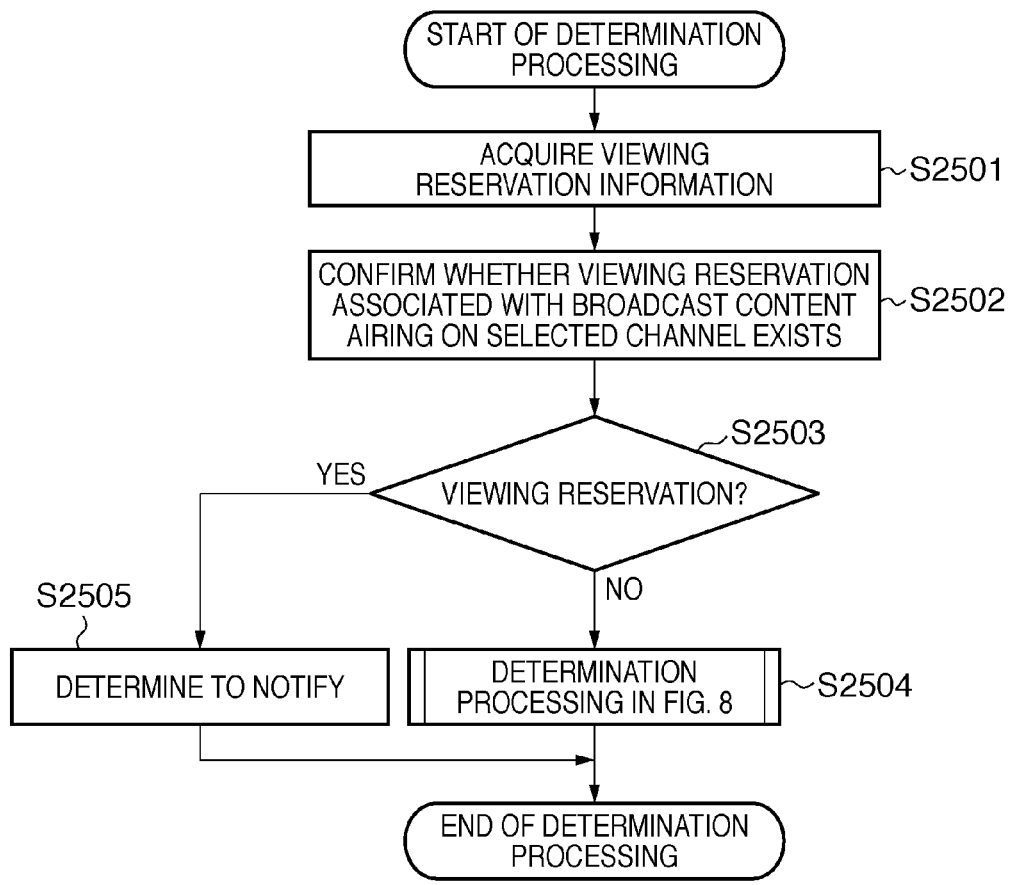
FIG. 21 is a flowchart illustrating determination processing.

FIG. 21 is a flowchart illustrating determination processing the notification control unit 800 performs in step S709 of FIG. 7 in place of the processing shown in the flowchart of FIG. 8. This will be described below based on the operation shown in FIG. 20.

First, the notification control unit 800 acquires viewing reservation information from the viewing reservation management unit (S2501). In this case, the broadcast start date/time "Jul. 1, 2008 18:00:00", broadcast time "01:00:00", and channel "Ch. A" are acquired as the viewing reservation information. Next, the notification control unit 800 confirms whether a viewing reservation associated with a broadcast content being aired on the selected channel exists (S2502). The channel selection date/time is "Jul. 1, 2008 18:15:00", and the selected channel is "Ch. A". By comparing them with the acquired viewing reservation information, the notification control unit 800 determines that there is a viewing reservation for the broadcast content "movie,  was ++" airing (YES in step S2503) and consequently determines to notify the user (S2505**).

On the other hand, assume that the user has selected the channel at "Jul. 1, 2008 19:00:00". There is no viewing reservation information associated with a broadcast content airing on the selected channel. This corresponds to NO in step S2503. In this case, the notification control unit 800 executes the determination processing in FIG. 8 (S2504).

After the broadcast content has been viewed for 30 sec, the notification control unit 800 notifies the user.

In this way, based on a viewing reservation and a date the user has selected the channel of a broadcast content, it is determined whether to notify the user of the existence of an archived content identical to a broadcast content. For example, if the user has made a viewing reservation but could not view a broadcast content from the beginning because of, for example, power off, notification is performed. Otherwise, notification is prohibited. This eliminates annoyance.

[Sixth Embodiment]

In the sixth embodiment, based on whether a user has recorded a content identical to a broadcast content, it is determined whether to notify the user of the existence of an archived content identical to the broadcast content. Note that a description of the same parts as in the first to fifth embodiments will not be repeated.

A content player 1 according to the sixth embodiment is connected to a video recorder as a peripheral device and configured to search for information of a content (to be referred to as recorded content information hereinafter) stored in the video recorder.

In the content player 1 according to the sixth embodiment, a CPU 11 searches, via a recorder interface added to FIG. 2, whether a content identical to a broadcast content is stored, in addition to the functions described in the first embodiment. Based on the internal state of the content player 1, the presence/absence of an archive, information accumulated in a memory 16, and a recorded content information search result, the CPU 11 also determines whether to notify a user that he/she can view a content from the beginning.

The recorder interface connects the video recorder to the content player 1. The recorder interface outputs, to the video recorder, a request of recorded content information searching to be executed by the CPU 11, and outputs, to the CPU 11, a recorded content information search result received from the video recorder.

A content player according to the sixth embodiment includes a recorded content information searching unit in addition to the arrangement shown in FIG. 3. A notification control unit 800 outputs a recorded content information search request to the recorded content information searching unit to search for recorded content information in the video recorder based on program attribute information acquired from a program information management unit 500, in addition to the functions described in the first embodiment. The notification control unit 800 thus acquires a recorded content information search result from the video recorder. Furthermore, based on the broadcast start date/time of a broadcast content, the current date/time, a channel selection date/time, and a recorded content information search result, the notification control unit 800 determines whether to notify a user that viewing a VOD content enables him/her to view, from the beginning, the broadcast content he/she is viewing. This determination processing will be described later.

The recorded content information searching unit searches, based on a recorded content information search request received from the notification control unit 800, whether a content identical to a broadcast content is recorded in the video recorder. The recorded content information searching unit also outputs a search result to the notification control unit 800 as a recorded content information search result.

FIG. 22 shows recorded content information stored in the video recorder at time "Jul. 1, 2008 18:15:00" with the program attribute information shown in FIG. 4.

T2901 represents that the video recorder has started recording a broadcast content "movie,  was ++" on a channel "Ch. A" at "Jul. 1, 2008 18:00:00" and recorded it for "00:15:00". This is because only 15 min have elapsed from the start of broadcast of the broadcast content "movie,  was ++", as indicated by the program attribute information shown in FIG. 4.

T2902 represents that the video recorder has started recording a broadcast content "movie, ○○ xx" on the channel "Ch. A" at "Jun. 24, 2008 18:00:00" and recorded it for "01:00:00".

Figure 23:
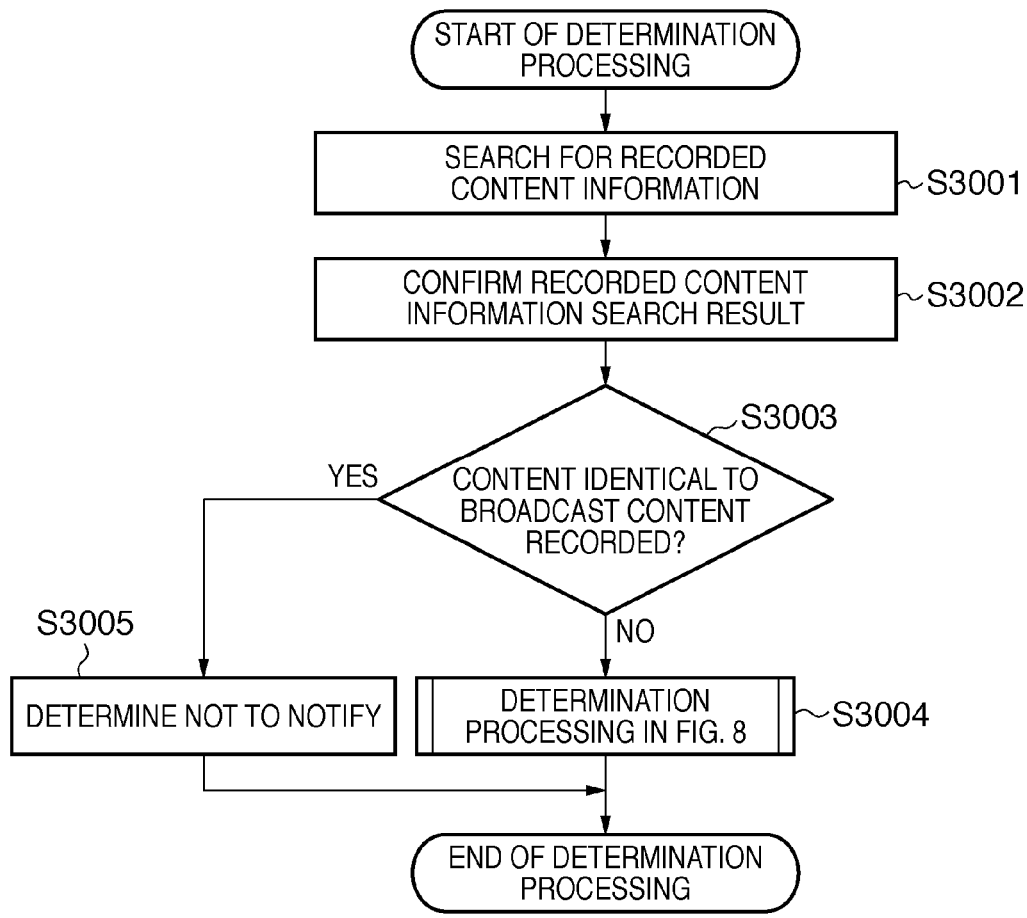
FIG. 23 is a flowchart illustrating determination processing.

FIG. 23 is a flowchart illustrating details of determination processing the notification control unit 800 performs in step S709 of FIG. 7 in place of the processing shown in the flowchart of FIG. 8. A case will be explained below in which channel selection is done at the timing in FIG. 6, and the video recorder records the recorded content information shown in FIG. 22.

First, the notification control unit 800 outputs, to the recorded content information searching unit, a recorded content information search request which uses, as a search condition, the program title "movie,  was ++" contained in the program attribute information, thereby searching for recorded content information (S3001**).

Next, the notification control unit 800 confirms the recorded content information search result received from the recorded content information searching unit (S3002). In this case, the content having the program title "movie,  was ++" has been recorded. Since recorded content information exists, the notification control unit 800 determines that a content identical to the broadcast content has been recorded (YES in step S3003) and consequently determines not to notify the user (S3005**).

On the other hand, assume that the content having the program title "movie,  was ++" has not been recorded. In this case, there is no recorded content information. This corresponds to NO in step S3003. The notification control unit 800 executes the determination processing in FIG. 8 (S3004). After the broadcast content has been viewed for 30 sec, the notification control unit 800** notifies the user.

In this way, based on whether the user has recorded a content identical to broadcast content, it is determined whether to notify the user of the existence of archived content identical to the broadcast content. If the user is not viewing the recorded content from the beginning, notification is prohibited. This eliminates annoyance.

Note that in this embodiment, another video recorder is connected to the content player. Instead, the content player may incorporate a recording function.

[Seventh Embodiment]

In the seventh embodiment, it is determined based on the genre of a broadcast content whether to notify a user of the existence of an archived content identical to the broadcast content. Note that a description of the same parts as in the first to sixth embodiments will not be repeated.

In a content player according to the seventh embodiment, a program information management unit 500 manages genres as program attribute information and, when outputting the program attribute information to a notification control unit 800, outputs a genre together with an identification ID, a channel, a program title, a broadcast start date/time, and a broadcast time, in addition to the functions described in the first embodiment.

Furthermore, based on the broadcast start date/time of a broadcast content, the current date/time, a channel selection date/time, and a genre in program attribute information, the notification control unit 800 determines whether to notify a user that he/she can view, from the beginning, a broadcast content he/she is viewing, in addition to the functions described in the first embodiment. This determination processing will be described later.

FIG. 24 shows program attribute information stored in the program information management unit 500.

T3201 represents that a broadcast content having an identification ID "ID1", a genre "movie", and a program title "movie, ** was ++" will be airing on a channel "Ch. A" for "01:00:00" from "18:00:00 on Jul. 1, 2008".

T3202 represents that a broadcast content having an identification ID "ID2", a genre "variety", and a program title "variety Δ, talk about □□□" will be airing on the channel "Ch. A" for "01:00:00" from "19:00:00 on Jul. 1, 2008".

T3203 represents that a broadcast content having an identification ID "ID3", a genre "news", and a program title "six o'clock news, follow-up on case ○○!" will be airing on a channel "Ch. B" for "01:00:00" from "18:00:00 on Jul. 1, 2008".

T3204 represents that a broadcast content having an identification ID "ID4", a genre "animation", and a program title "animation, ○○○○ comes out at last!?" will be airing on the channel "Ch. B" for "00:30:00" from "19:00:00 on Jul. 1, 2008".

Figures 25, 26:
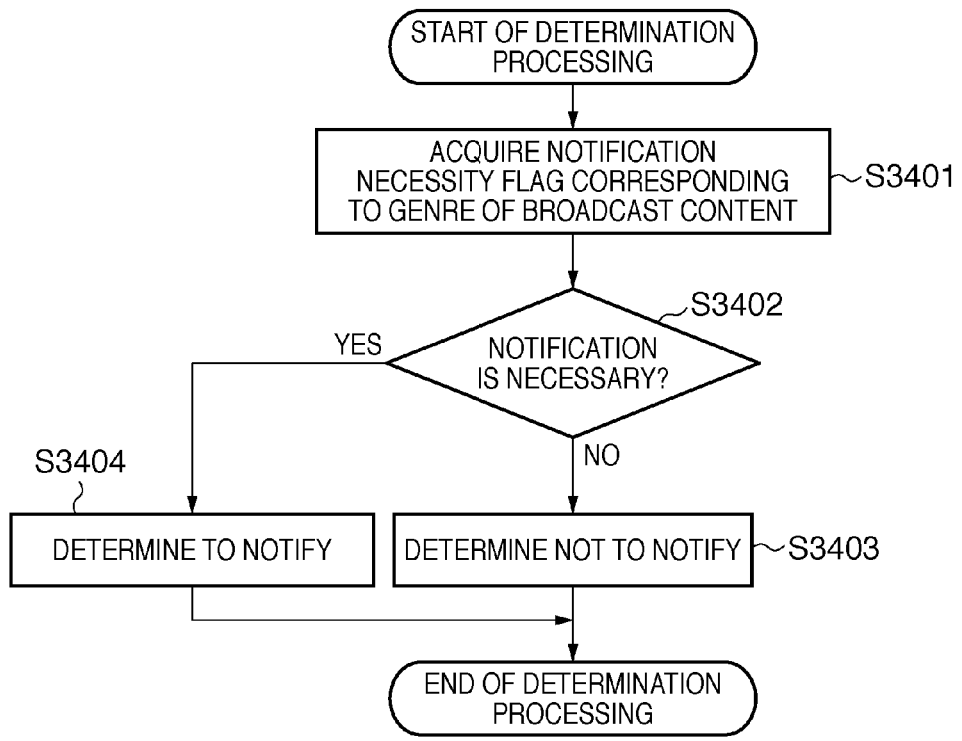
FIG. 25 is a view showing a notification necessity flag.
FIG. 26 is a flowchart illustrating determination processing.

FIG. 25 shows genres of broadcast content and a notification necessity flag indicating whether to notify a user.

T3301 represents that when the genre of a broadcast content is "movie", "notification is necessary" for the user. T3302 represents that when the genre of a broadcast content is "variety", "notification is unnecessary" for the user.

T3303 represents that when the genre of a broadcast content is "news", "notification is unnecessary" for the user.

T3304 represents that when the genre of a broadcast content is "animation", "notification is necessary" for the user. T3305 represents that when the genre of a broadcast content is "drama", "notification is necessary" for the user.

FIG. 26 is a flowchart illustrating determination processing the notification control unit 800 performs in step S709 of FIG. 7 in place of the processing shown in the flowchart of FIG. 8. This will be described below based on the operation shown in FIG. 6.

First, based on the genre in the program attribute information of a broadcast content to be viewed, the notification control unit 800 acquires a corresponding notification necessity flag "notification is necessary" from FIG. 25 (S3401). In this case, the genre is "movie", and it corresponds to T3301 in FIG. 25. Hence, the notification control unit 800 determines that the notification necessity flag indicates "notification is necessary" (YES in step S3402) and consequently determines to notify the user (S3404).

Assume that the user has selected the channel "Ch. B" at the time "Jul. 1, 2008 18:15:00". The broadcast content being airing on the channel "Ch. B" is "six o'clock news, follow-up on case ○○!". In this case, the genre of the broadcast content is "news" which corresponds to T3303 in FIG. 25. Hence, the notification control unit 800 acquires a notification necessity flag "notification is unnecessary". The notification control unit 800 determines that notification is unnecessary (NO in step S3402), and user notification will be prohibited (S3403).

In this way, based on the genre of a broadcast content selected by a user, it is determined whether to notify the user of the existence of an archived content identical to a broadcast content. Since notification is done based on a preset rule to, for example, output a notification for a movie but not for news, annoyance is eliminated.

Note that in this embodiment, the correspondence between the genre and the notification necessity flag is set as shown in FIG. 25. However, the correspondence between the genre and the notification necessity flag may arbitrarily be set by the user. In addition, instead of determining not to notify the user in step S3403 of FIG. 26, the notification control unit 800 may execute the processing in FIG. 8, and after viewing for a predetermined time, notify the user.

[Eighth Embodiment]

In the eighth embodiment, instead of notifying a user that he/she can view a VOD content, the viewing target is switched to a VOD content at the time the user has selected a channel. Note that a description of the same parts as in the first to seventh embodiments will not be repeated.

A content player according to the eighth embodiment removes the notification control unit and the notification image generating unit from the arrangement shown in FIG. 3 and adds an automatic VOD switching control unit. A user interface unit 300 receives an instruction such as "channel up" or "select Ch. A" from a user and outputs a channel selection request to a channel selection control unit 400 to perform an operation complying with the instruction. Note that a user instruction is normally input via a remote controller and is sometimes accompanied with an operation screen including options such as "YES" and "NO".

Upon receiving VOD content location information and playback control information from the automatic VOD switching control unit, a playback control unit 700 outputs, to a VOD reception/playback unit 200, a VOD content playback request based on the playback control information and the VOD content location information. The playback control unit 700 also outputs a switching instruction to an input switching unit 1000 to output the video of a VOD content to a monitor 6. Additionally, based on a request from the automatic VOD switching control unit, the playback control unit 700 outputs the belonging information and playback position of the VOD content that is being played back as a VOD content viewing state.

The input switching unit 1000 switches a video to be output to the monitor 6 in accordance with a switching instruction from the channel selection control unit 400 or the playback control unit 700, and also stores information indicating the current output source, that is, a broadcast content or a VOD content.

The automatic VOD switching control unit receives a channel selection notification from a broadcast reception/playback unit 100 and acquires program attribute information and VOD content location information from a program information management unit 500. After that, the automatic VOD switching control unit acquires the current date/time from the broadcast reception/playback unit 100 and determines whether to switch to VOD content viewing. This determination processing will be described later.

To switch to VOD content viewing, the automatic VOD switching control unit outputs VOD content location information and playback control information to the playback control unit 700. Upon receiving a channel selection notification from the broadcast reception/playback unit 100, the automatic VOD switching control unit acquires, from the playback control unit 700, the viewing state of a VOD content the user is viewing and stores it.

Figure 27:
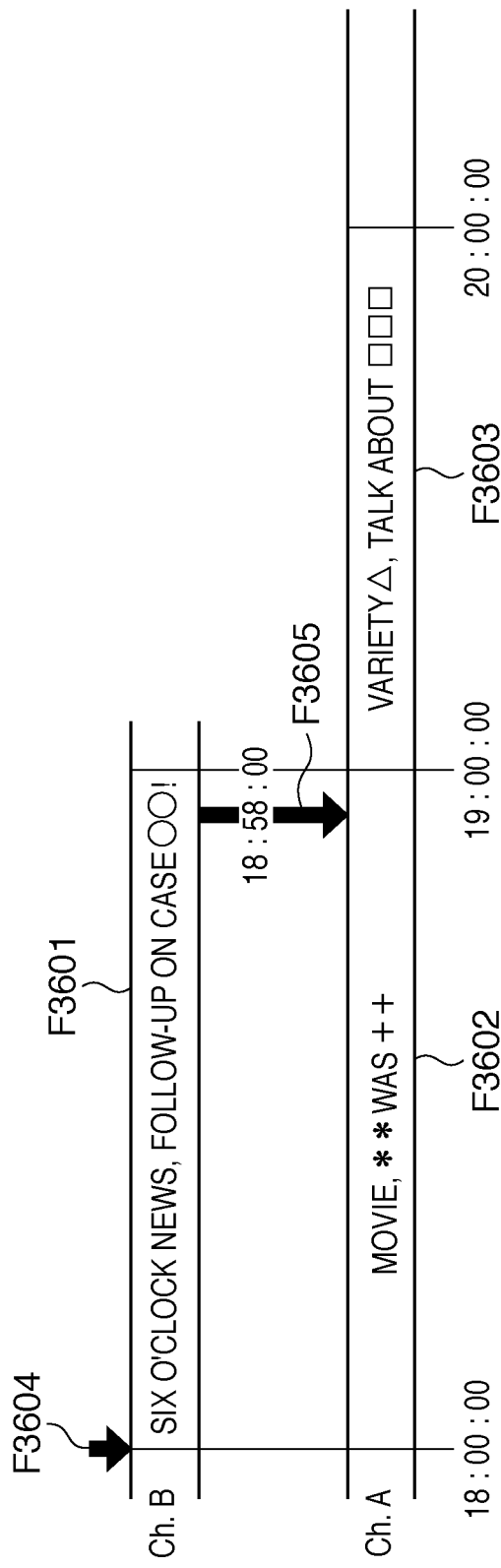
FIG. 27 is a view showing a timing of channel selection by a user.

FIG. 27 shows the timings of user's selection of channels "Ch. A" and "Ch. B" on Jul. 1, 2008 when the program attribute information in FIG. 4 and the VOD content location information in FIG. 5 are stored.

Referring to FIG. 27, the user has started viewing a broadcast content "six o'clock news, follow-up on case ◯◯!" F3601 at its broadcast start time "18:00:00", as indicated by F3604. The user has then selected the channel "Ch. A" at time "18:58:00" immediately before the end of broadcast of a broadcast content "movie, ** was ++" F3602, as indicated by F3605. This suggests that the user is going to view a broadcast content "variety Δ, talk about □□□" indicated by F3603 which starts at time "19:00:00".

Figure 28:
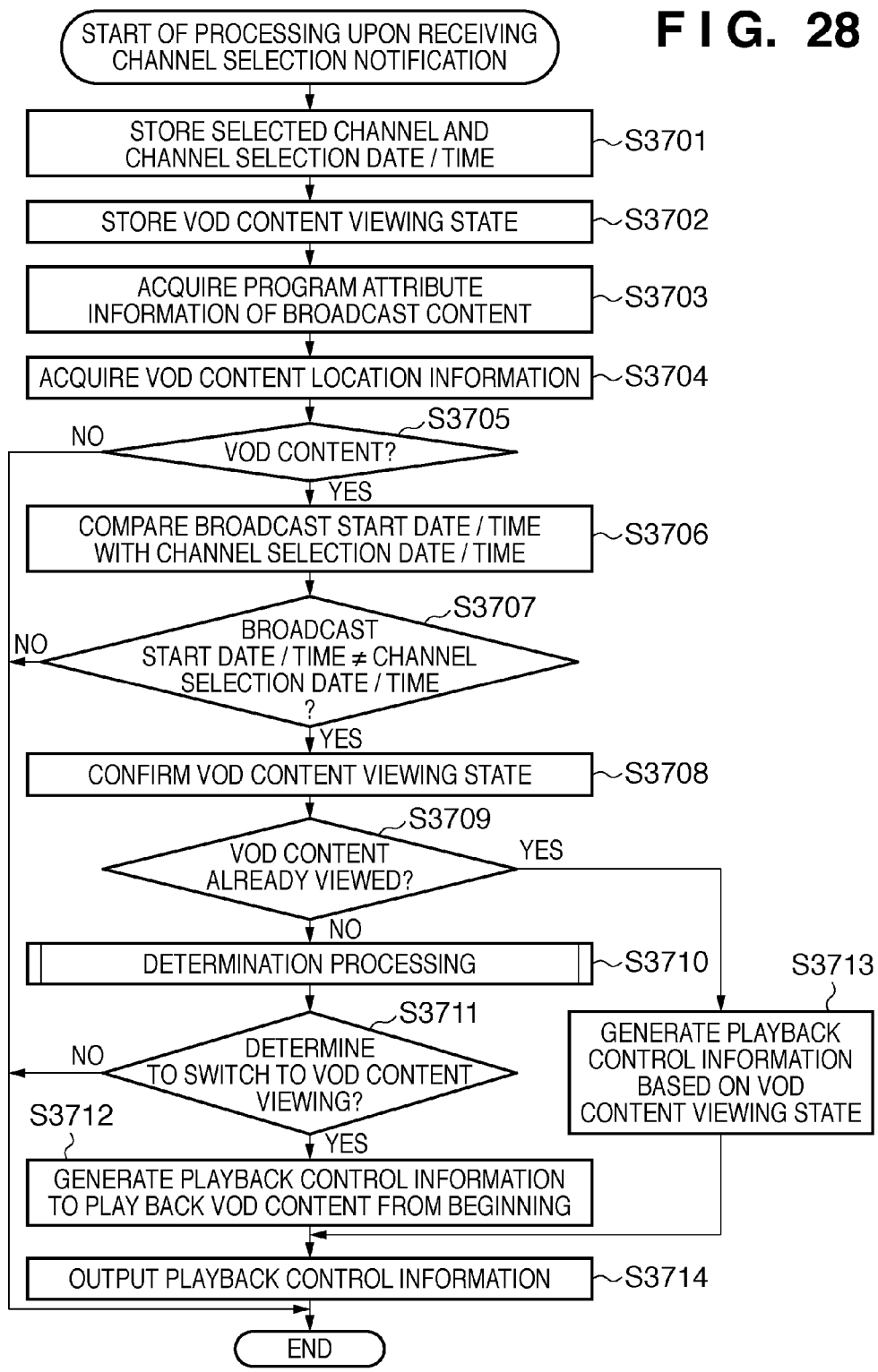
FIG. 28 is a flowchart illustrating the operation of an automatic VOD switching control unit upon receiving a channel selection notification.

FIG. 28 is a flowchart illustrating the operation of the automatic VOD switching control unit upon receiving a channel selection notification from the broadcast reception/playback unit 100. This will be explained below concerning the time the user has selected the channel "Ch. A" in FIG. 27.

Upon receiving a channel selection notification from the broadcast reception/playback unit 100, the automatic VOD switching control unit stores the selected channel "Ch. A" and the channel selection date/time "Jul. 1, 2008 18:58:00" included in the channel selection notification (S3701).

Next, the automatic VOD switching control unit requests the viewing state of the VOD content the user is currently viewing from the playback control unit 700 and stores the acquired VOD content viewing state (S3702). In this case, since the user has viewed the broadcast content "six o'clock news, follow-up on case ◯◯!" on the channel "Ch. B" immediately before selection of the channel "Ch. A", no VOD content viewing state is acquired. Hence, the automatic VOD switching control unit stores no viewing state.

After that, based on the selected channel and the channel selection date/time, the automatic VOD switching control unit acquires, from the program information management unit 500, program attribute information about the broadcast content "movie, ** was ++" airing (S3703).

Based on the identification ID in the program attribute information, the automatic VOD switching control unit acquires VOD content location information associated with the broadcast content the user is viewing (S3704). In this case, VOD content location information "http://◯◯◯.net/◯◯" is acquired. Hence, the automatic VOD switching control unit determines that a VOD content exists (YES in step S3705), and compares the broadcast start date/time "Jul. 1, 2008 18:00:00" contained in the acquired program attribute information with the channel selection date/time (S3706). In this case, since the broadcast start date/time does not coincide with the channel selection date/time (YES in step S3707), the automatic VOD switching control unit determines that the user has not viewed the broadcast content from the beginning. The automatic VOD switching control unit confirms the VOD content viewing state associated with the VOD content (S3708). In this case, the user has not viewed the VOD content corresponding to the broadcast content "movie, ** was ++" before the channel selection date/time "Jul. 1, 2008 18:58:00". The automatic VOD switching control unit therefore determines that the user has not started yet viewing the VOD content (NO in step S3709), and determines whether to switch to VOD content viewing (S3710). This determination processing will be explained later.

Upon determining not to switch to VOD content viewing (NO in step S3711), the processing ends without outputting playback control information. No playback control information is output either without a VOD content associated with the broadcast content the user is viewing (NO in step S3705), or upon determining that the user has viewed the broadcast content from the beginning because of coincidence between the broadcast start date/time of the broadcast content and the channel selection date/time (NO in step S3707).

On the other hand, upon determining to switch to VOD content viewing (YES in step S3711), the automatic VOD switching control unit generates playback control information to play back the VOD content from the beginning (S3712). The automatic VOD switching control unit outputs the playback control information to the playback control unit 700 together with the VOD content location information "http://◯◯◯.net/◯◯" (S3714).

If the user has viewed the VOD content, then selected another channel, and viewed the VOD content again, the automatic VOD switching control unit determines based on the VOD content viewing state that the user has already started viewing the VOD content (YES in step S3709). In this case, the automatic VOD switching control unit generates playback control information based on the VOD content viewing state (S3713) and outputs it to the playback control unit 700.

Figure 29:
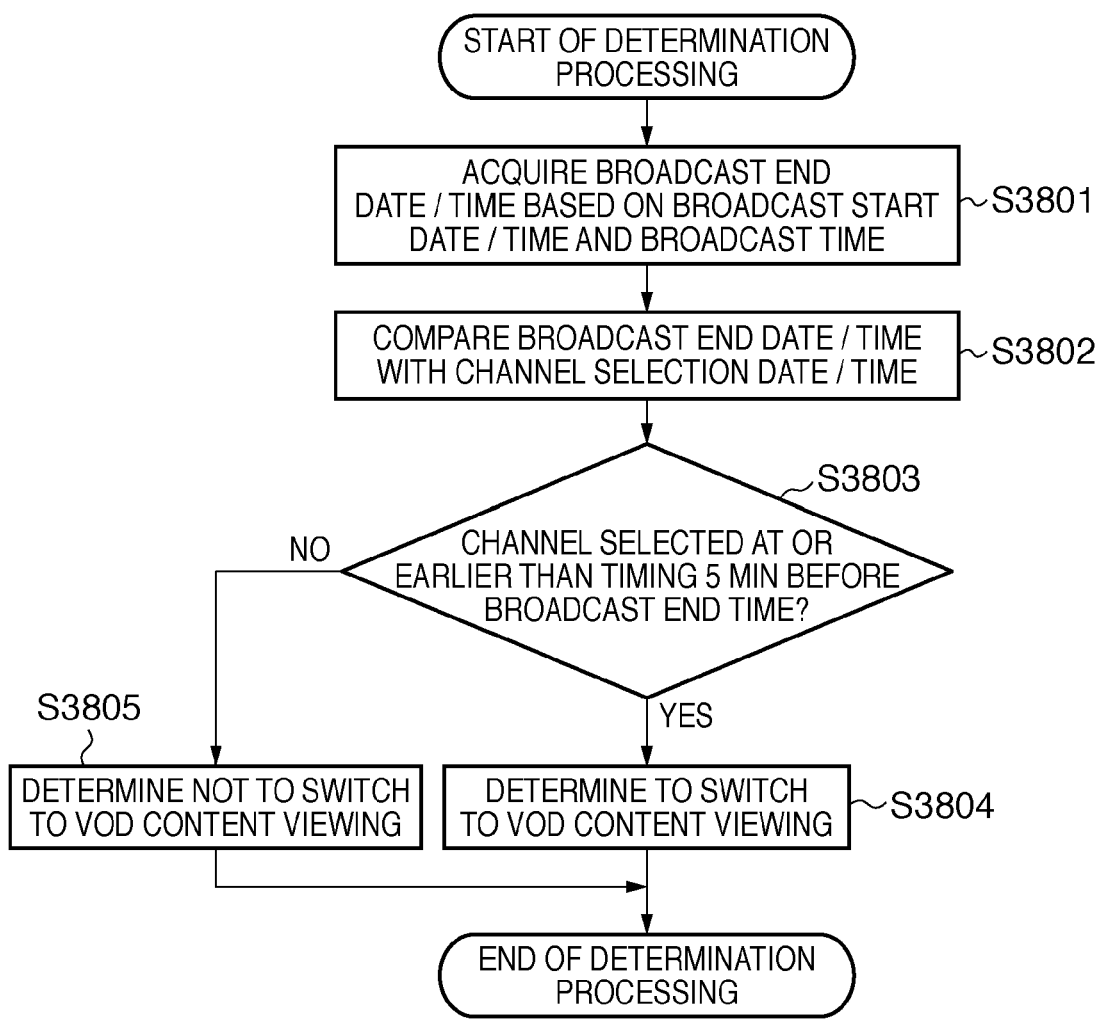
FIG. 29 is a flowchart illustrating determination processing.

FIG. 29 is a flowchart illustrating the determination processing in step S3710 of FIG. 28. This will be described below based on the operation in FIG. 27.

First, the automatic VOD switching control unit acquires the broadcast end date/time "Jul. 1, 2008 19:00:00" based on the broadcast start date/time and broadcast time of the broadcast content (S3801).

The automatic VOD switching control unit compares the broadcast end date/time with the channel selection date/time (S3802). The channel selection date/time is "Jul. 1, 2008 18:58:00". The difference between the broadcast end date/time and the channel selection date/time is "00:02:00". The automatic VOD switching control unit determines that the user has selected the channel after the timing 5 min before the broadcast end time (NO in step S3803) and consequently determines not to switch to VOD content viewing (S3805).

On the other hand, assume that the user has selected the channel at "Jul. 1, 2008 18:50:00". The difference between the broadcast end date/time and the channel selection date/time is "00:10:00". The automatic VOD switching control unit determines that the user has selected the channel at or earlier than a timing a predetermined time, that is, 5 min before the broadcast end time (YES in step S3803). Hence, the automatic VOD switching control unit determines to switch to VOD content viewing (S3804).

In this way, based on the date/time the user has selected the channel of a broadcast content and the broadcast end time, it is determined whether to automatically switch to VOD content viewing if an archived content identical to the broadcast content exists. This suppresses forcible switching to VOD content viewing when the user has, for example, selected a channel to view a broadcast content to be airing next, and eliminates annoyance.

Note that in this embodiment, if channel selection has been done at or earlier than a timing 5 min before the broadcast end time, switching to VOD content viewing is performed. However, the time may arbitrarily be set by the user.

Determining whether to switch to VOD content viewing may be done by applying at least one of the determination processes of the second to seventh embodiments.

[Other Embodiments]

The conditions of the determination processes described in the second to seventh embodiments may be combined as needed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-296040, filed Nov. 19, 2008, which is hereby incorporated by reference herein in its entirety.

What is claimed is:

1. A content display apparatus which receives a broadcast content transmitted by a broadcast wave and a video content distributed via a network and displays a video image concerning a content, comprising:
 a processor performing the functions of a channel selection control unit, a content information management unit, a notification control unit and a notification generation unit, wherein;
 the channel selection control unit selects a channel to view the broadcast content;
 the content information management unit stores location information of a video content corresponding to the broadcast content on the channel selected by the channel selection control unit;
 the notification control unit notifies that it is possible to view the broadcast content from the beginning when a time for the channel selection to view the broadcast content does not coincide with a broadcast start time of the broadcast content; and
 the notification generation unit generates a notification image for notification when it is determined to notify that it is possible to view the broadcast content from the beginning,
 wherein the notification control unit determines to notify in at least one of (i) a case in which the broadcast content on the selected channel has been viewed for not less than a predetermined time period after the channel selection, (ii) a case in which the broadcast content on the selected channel is not immediately before a broadcast end time of the broadcast content at the time of the channel selection, (iii) a case in which a broadcast content on another channel that has been viewed before the channel selection is not a commercial content, and (iv) a case in which a viewing time of a broadcast content on another channel that has been viewed before the channel selection is not more than a predetermined time period,
 wherein the notification control unit determines not to notify that it is possible to view the broadcast content from the beginning, when the broadcast content does not meet any one of the cases (i) to (iv).

2. The content display apparatus according to claim 1, wherein the notification control unit determines not to notify that it is possible to view the broadcast content from the beginning when a broadcast content that has been viewed immediately preceding to the channel selection is a commercial content or when a broadcast content that has been viewed immediately preceding to the channel selection is a recorded content.

3. The content display apparatus according to claim 1, wherein the notification image generated by the notification generation unit is an image for a user to select whether to view the broadcast content from the beginning,
 and the processor further performing the function of a switching unit, wherein the switching unit switches from viewing the broadcast content to viewing the video content corresponding to the broadcast content based on the location information so as to display the switched video content when the user selects to view the broadcast content from the beginning.

4. The content display apparatus according to claim 1, wherein the notification control unit determines to notify that it is possible to view the broadcast content from the beginning when a program genre of the broadcast content on the selected channel belongs to a predetermined program genre.

5. The content display apparatus according to claim 4, wherein the program genre of the broadcast content includes at least one of "movie", "variety", "news", "animation" and "drama".

6. The content display apparatus according to claim 1, wherein the notification control unit determines to notify that it is possible to view the broadcast content from the beginning when a time at which the viewing of the broadcast content on the selected channel has started is earlier than a predetermined time period before a broadcast end time of the broadcast content on the selected channel.

7. The content display apparatus according to claim 1, wherein the notification generation unit can be set not to generate the notification image even where the notification control unit has determined to notify.

8. The content display apparatus according to claim 1, the processor further performing the function of a determination unit, wherein the determination unit is configured to determine whether the broadcast content meets any one of the cases (i) to (iv), when the determination unit determines that the broadcast content meets any one of the cases (i) to (iv), the notification control unit determines to notify that it is possible to view the broadcast content from the beginning.

9. A method of controlling a content display apparatus which receives a broadcast content transmitted by a broadcast wave and a video content distributed via a network and displays a video image concerning a content, comprising:
 selecting a channel to view the broadcast content;
 storing location information of a video content corresponding to the broadcast content on the selected channel;
 notifying that it is possible to view the broadcast content from the beginning when a time for the channel selection to view the broadcast content does not coincide with a broadcast start time of the broadcast content;
 determining to notify in at least one of (i) a case in which the broadcast content on the selected channel has been viewed for not less than a predetermined time period, (ii) a case in which the broadcast content on the selected channel is not immediately before a broadcast end time of the broadcast content at the time of the channel selection, (iii) a case in which a broadcast content on another channel that has been viewed before the channel selection is not a commercial content, and (iv) a case in which a viewing time of a broadcast content on another channel that has been viewed before the channel selection is not more than a predetermined time period, and determining not to notify that it is possible to view the broadcast content from the beginning, when the broadcast content does not meet any one of the cases (i) to (iv); and generating a notification image for notification when it is determined to notify that it is possible to view the broadcast content from the beginning.

10. The method of controlling the content display apparatus according to claim 9, wherein in the step of notifying, it is determined not to notify that it is possible to view the broadcast content from the beginning when a broadcast content that has been viewed immediately preceding the channel selection is a commercial content or when a broadcast content that has been viewed immediately preceding the channel selection is a recorded content.

11. The method of controlling the content display apparatus according to claim 9, wherein the notification image generated in the step of generating is an image for a user to select whether to view the broadcast content from the beginning, and further comprising switching from viewing the broadcast content to viewing the video content corresponding to the broadcast content based on the location information so as to display the switched video content when the user selects to view the broadcast content from the beginning.

12. The method of controlling the content display apparatus according to claim 9, wherein in the step of notifying, it is determined to notify that it is possible to view the broadcast content from the beginning when a program genre of the broadcast content on the selected channel belongs to a predetermined program genre.

13. The method of controlling the content display apparatus according to claim 12, wherein the program genre of the broadcast content includes at least one of "movie", "variety", "news", "animation" and "drama".

14. The method of controlling the content display apparatus according to claim 9, wherein in the step of notifying, it is determined to notify that it is possible to view the broadcast content from the beginning when a time at which the viewing of the broadcast content on the selected channel has started is earlier than a predetermined time period a broadcast end time of the broadcast content on the selected channel.

15. The method of controlling the content display apparatus according to claim 9, wherein it can be set not to generate the notification image in the step of generating even where it is determined to notify in the step of notifying.

16. The method of controlling the content display apparatus according to claim 9, further comprising determining whether the broadcast content meets any one of the cases (i) to (iv), when the broadcast content meets any one of the cases (i) to (iv), it is determined to notify that it is possible to view the broadcast content from the beginning.

17. A content display apparatus which receives a broadcast content transmitted by a broadcast wave and a video content distributed via a network and displays a video image concerning a content, comprising:

a processor performing the functions of a channel selection control unit, a content information management unit, a notification control unit and a notification generation unit, wherein;

the channel selection control unit selects a channel to view the broadcast content;

the content information management unit stores location information of a video content corresponding to the broadcast content on the channel selected by the channel selection control unit;

the notification control unit notifies that it is possible to view the broadcast content from the beginning when a time for the channel selection to view the broadcast content does not coincide with a broadcast start time of the broadcast content; and the notification generation unit generates a notification image for notification when it is determined to notify that it is possible to view the broadcast content from the beginning;

wherein the notification control unit determines to notify in a case in which the broadcast content on the selected channel has been viewed for not less than a predetermined time period after the channel selection, and determines not to notify when the broadcast content does not meet the case.

18. The content display apparatus according to claim 17, the processor further performing the function of a determination unit, wherein the determination unit is configured to determine whether the broadcast content meets the case, when the determination unit determines that the broadcast content meets the case, the notification control unit determines to notify that it is possible to view the broadcast content from the beginning.

19. A method of controlling a content display apparatus which receives a broadcast content transmitted by a broadcast wave and a video content distributed via a network and displays a video image concerning a content, comprising:

selecting a channel to view the broadcast content;

storing location information of a video content corresponding to the broadcast content on the selected channel;

notifying that it is possible to view the broadcast content from the beginning when a time for the channel selection to view the broadcast content does not coincide with a broadcast start time of the broadcast content;

determining to notify in a case in which the broadcast content on the selected channel has been viewed for not less than a predetermined time period after the channel selection, and determining not to notify when the broadcast content does not meet the case; and generating a notification image for notification when it is determined to notify that it is possible to view the broadcast content from the beginning.

20. The method of controlling the content display apparatus according to claim 19, further comprising determining whether the broadcast content meets the case, when the broadcast content meets the case, it is determined to notify that it is possible to view the broadcast content from the beginning.

* * * * *